US010464122B2

(12) United States Patent
Blacket et al.

(10) Patent No.: US 10,464,122 B2
(45) Date of Patent: Nov. 5, 2019

(54) SPOT-JOINING APPARATUS AND METHODS

(71) Applicant: Henrob Limited, Flintshire (GB)

(72) Inventors: Stuart Edmund Blacket, Queensland (AU); Wojciech Gostylla, Queensland (AU)

(73) Assignee: Atlas Copco IAS UK Limited, Flintshire (GB)

( * ) Notice: Subject to any disclaimer, the term of this patent is extended or adjusted under 35 U.S.C. 154(b) by 384 days.

(21) Appl. No.: 14/414,136

(22) PCT Filed: Jul. 12, 2013

(86) PCT No.: PCT/GB2013/051876
§ 371 (c)(1),
(2) Date: Jan. 12, 2015

(87) PCT Pub. No.: WO2014/009754
PCT Pub. Date: Jan. 16, 2014

(65) Prior Publication Data
US 2015/0209857 A1   Jul. 30, 2015

(30) Foreign Application Priority Data

Jul. 13, 2012   (GB) .................................. 1212538.1
Aug. 29, 2012  (GB) .................................. 1215341.7

(51) Int. Cl.
*B32B 41/00*   (2006.01)
*B21J 15/26*   (2006.01)
(Continued)

(52) U.S. Cl.
CPC ............. *B21J 15/26* (2013.01); *B21J 15/027* (2013.01); *B21J 15/043* (2013.01); *B21J 15/28* (2013.01);
(Continued)

(58) Field of Classification Search
CPC ... F16D 51/08; F16D 27/112; B29C 65/7437; B29C 66/8322; B29C 66/1122;
(Continued)

(56) References Cited

U.S. PATENT DOCUMENTS 2,473,913 A   6/1949  Shaff
4,063,443 A   12/1977 Yarbrough
(Continued)

FOREIGN PATENT DOCUMENTS

CN   1125474   6/1996
CN   1132541   10/1996
(Continued)

OTHER PUBLICATIONS

International Search Report for International Application No. PCT/GB2013/051876 dated Feb. 5, 2014 (6 pages).
(Continued)

*Primary Examiner* — Michael N Orlando
*Assistant Examiner* — Joshel Rivera
(74) *Attorney, Agent, or Firm* — Michael Best & Friedrich LLP

(57) ABSTRACT

A spot-joining apparatus comprises a motor, a punch for driving a fastener or performing a clinching or friction stir spot welding operation, a first transmission, a second transmission and a transmission control apparatus. The first transmission is configured to transfer rotary motion of the motor to the punch when engaged. The second transmission is configured to convert rotary motion of the motor to linear motion of the punch, and thereby drive the punch towards a workpiece, when engaged. The transmission control apparatus is arranged to selectively adjust the degree of engagement of at least one of the first and second transmissions. Further apparatus for spot joining, and methods of spot-joining, are also disclosed.

35 Claims, 14 Drawing Sheets

(51) Int. Cl.

| | | |
|---|---|---|
| *B21J 15/02* | (2006.01) | |
| *B21J 15/04* | (2006.01) | |
| *B23K 20/12* | (2006.01) | |
| *F16D 27/112* | (2006.01) | |
| *F16D 51/08* | (2006.01) | |
| *B21J 15/28* | (2006.01) | |
| *B29C 65/06* | (2006.01) | |
| *F16D 37/00* | (2006.01) | |
| *F16D 57/00* | (2006.01) | |
| *F16H 25/20* | (2006.01) | |
| *F16H 25/22* | (2006.01) | |
| *B21J 15/32* | (2006.01) | |
| *B29C 65/56* | (2006.01) | |
| *B29C 65/74* | (2006.01) | |
| *B29C 65/00* | (2006.01) | |
| *B29L 9/00* | (2006.01) | |

(52) U.S. Cl.
CPC ........... *B21J 15/326* (2013.01); *B23K 20/123* (2013.01); *B23K 20/125* (2013.01); *B29C 65/06* (2013.01); *F16D 27/112* (2013.01); *F16D 37/008* (2013.01); *F16D 51/08* (2013.01); *F16D 57/002* (2013.01); *F16H 25/2025* (2013.01); *F16H 25/2266* (2013.01); *B29C 65/069* (2013.01); *B29C 65/0672* (2013.01); *B29C 65/562* (2013.01); *B29C 65/7437* (2013.01); *B29C 66/1122* (2013.01); *B29C 66/21* (2013.01); *B29C 66/41* (2013.01); *B29C 66/7212* (2013.01); *B29C 66/8322* (2013.01); *B29L 2009/00* (2013.01); *Y10T 29/49835* (2015.01); *Y10T 29/49956* (2015.01); *Y10T 29/5377* (2015.01); *Y10T 29/53752* (2015.01); *Y10T 74/18568* (2015.01); *Y10T 74/18664* (2015.01)

(58) Field of Classification Search
CPC ....... B29C 66/21; B29C 66/41; B29C 65/562; B29C 65/069; B29C 65/0672; B29C 66/7212; F16C 51/08; F16C 27/112
USPC .......................... 156/64, 350, 351, 378, 379
See application file for complete search history.

(56) References Cited

U.S. PATENT DOCUMENTS

| | | | |
|---|---|---|---|
| 4,910,992 | A | 3/1990 | Stenberg et al. |
| 5,256,017 | A | 10/1993 | Smirnov et al. |
| 5,511,298 | A | 4/1996 | Gasser |
| 6,373,207 | B1 | 4/2002 | Yablonovitch |
| 7,024,270 | B2* | 4/2006 | Mauer .................... B21J 15/025 29/716 |
| 7,695,227 | B2 | 4/2010 | Stevenson et al. |
| 7,832,074 | B2 | 11/2010 | Stevenson et al. |
| 7,862,271 | B2 | 1/2011 | Wang et al. |
| 8,443,512 | B2 | 5/2013 | Masugata |
| 2002/0125297 | A1 | 9/2002 | Stol et al. |
| 2002/0166221 | A1 | 11/2002 | Clew |
| 2005/0178816 | A1 | 8/2005 | Stevenson et al. |
| 2008/0093420 | A1 | 4/2008 | Mauer |
| 2009/0061187 | A1 | 3/2009 | Wang et al. |
| 2009/0070976 | A1 | 3/2009 | Amirault |
| 2010/0084456 | A1* | 4/2010 | Carter ................ B23K 20/1255 228/112.1 |
| 2010/0186900 | A1 | 7/2010 | Christ |
| 2010/0232907 | A1 | 9/2010 | Jokisch |
| 2010/0275424 | A1 | 11/2010 | Masugata |
| 2011/0164945 | A1 | 7/2011 | Lathabai et al. |
| 2015/0143686 | A1 | 5/2015 | Blacket et al. |

FOREIGN PATENT DOCUMENTS

| | | |
|---|---|---|
| CN | 101468421 | 7/2009 |
| CN | 101722360 | 6/2010 |
| CN | 101877515 | 11/2010 |
| CN | 102233402 | 11/2011 |
| CN | 102319952 | 1/2012 |
| DE | 2417646 | 10/1947 |
| EP | 0953390 | 11/1999 |
| EP | 1712311 | 10/2006 |
| EP | 2072174 A1 | 6/2009 |
| JP | 3189042 | 8/1991 |
| JP | H0471728 | 3/1992 |
| JP | H11-320016 | 11/1999 |
| JP | 20000002274 | 1/2000 |
| JP | 2001321878 | 11/2001 |
| JP | 2001349394 | 12/2001 |
| JP | 2002239755 | 8/2002 |
| JP | 2004017084 | 1/2004 |
| JP | 2005153008 | 6/2005 |
| JP | 2005288525 | 10/2005 |
| JP | 2006289502 | 10/2006 |
| JP | 2008155806 | 7/2008 |
| KR | 1020110112209 | 10/2011 |
| WO | 1994029602 | 12/1994 |
| WO | 2008072380 A1 | 6/2008 |
| WO | 2011060499 | 5/2011 |

OTHER PUBLICATIONS

Third Office Action from the State Intellectual Property Office of China for Application No. 2013800374465 dated Jan. 3, 2017 (7 pages).
First Office Action from the State Intellectual Property Office of China for Application No. 201380037503X dated Oct. 27, 2015 (8 pages).
Office Action from the Korean Intellectual Property Office for Application No. 1020157003810 dated Jan. 7, 2016 (14 pages).
Office Action from the Korean Intellectual Property Office for Application No. 1020157003899 dated Feb. 1, 2016 (18 pages).
Office Action from the Patent Office of Japan for Application No. 2015-521070 dated Apr. 20, 2107 (15 pages).
Office Action from the State Intellectual Property Office of China for Application No. 201380037446.5 dated Nov. 20, 2015 (6 pages).
Office Action from the Japanese Patent Office for Application No. 2015-521069 dated May 17, 2017 (17 pages).
English Translation of Japanese Patent Office Action for Application 2017-150338 dated Jul. 31, 2018 (5 pages).
International Search Report for related Application No. PCT/GB2013/051875 dated Oct. 28, 2013 (4 pages).

* cited by examiner

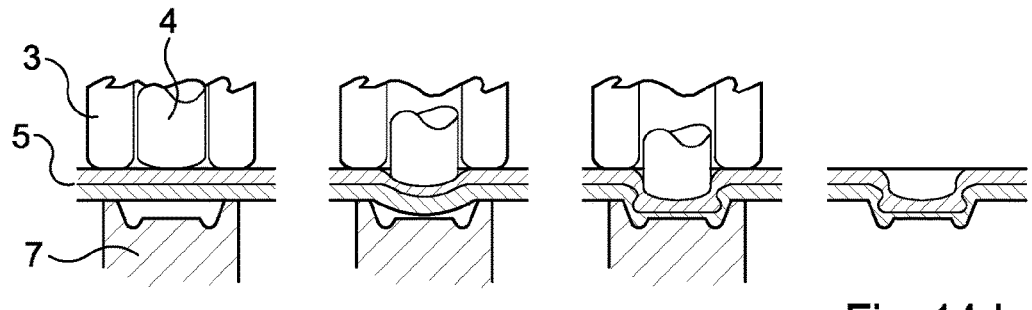
Fig. 14a  Fig. 14b  Fig. 14c  Fig. 14d
Fig. 14
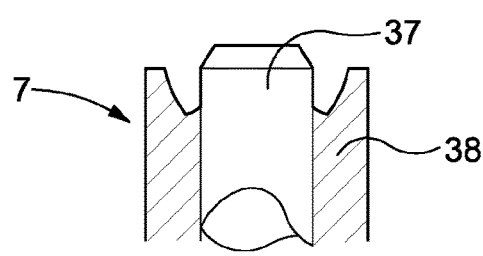
Fig. 15

SPOT-JOINING APPARATUS AND METHODS

CROSS-REFERENCE TO RELATED APPLICATIONS

This patent application is a national stage filing under 35 U.S.C. 371 of International Patent Application No. PCT/GB2013/051876, filed Jul. 12, 2013 which claims priority to United Kingdom Patent Application No. 1212538.1, filed Jul. 13, 2012 and United Kingdom Patent Application No. 1215341.7, filed Aug. 29, 2012, the entire contents of which are hereby incorporated by reference herein.

FIELD OF THE INVENTION

The present invention relates to spot-joining apparatus and methods.

BACKGROUND

One known spot-joining method is friction stir spot welding. In friction stir spot welding a cylindrical punch with a shouldered probe at its tip is rotated and driven into the layers to be joined. Sliding friction between the probe and the workpiece layers causes the layers to soften and plasticise without melting, and the rotation of the probe displaces the material and causes the plasticised portions of the two layers to intermingle. When the punch is withdrawn and the workpiece allowed to cool, the intermingled plasticised portions harden and produce a welded joint between the two layers.

Recently, the softening of material through a friction stir mechanism has been used in relation to blind riveting. Rather than pre-drilling a hole for the rivet, the rivet is rotated and driven into the workpiece so as to cause friction stir softening of the material. The rivet is then driven through the workpiece and, once the material has cooled, the rivet is set in the usual manner. In addition, the possibility of driving a fastener (either for fastening two or more layers of a workpiece together or for providing an anchoring point such as a threaded stud in a workpiece of one or more layers) and joining it to the workpiece by friction stir welding has also been explored. In this case, the fastener is made of a material of similar hardness to one of the layers of the workpiece so that the fastener itself is plasticised and intermingles with the plasticised portion(s) of the workpiece.

Present spot-joining machines and methods which utilise friction stir softening, such as those above, utilise at least one actuator (a motor) to produce the required rotation of the fastener or welding punch and at least one additional actuator to produce the linear motion required to drive the fastener or tip of the punch into the workpiece. Use of two actuators not only increases the cost of the apparatus, but also significantly increases its bulk and weight. The added weight may limit the performance or life of robotic arms on which the apparatus is mounted, and the added bulk may prevent the apparatus from reaching into small spaces. Use of two actuators may also adversely affect the service life and/or maintenance cost of the apparatus.

It is an object of the present invention to obviate or mitigate at least one of the aforesaid disadvantages, and/or to provide an improved or alternative spot-joining apparatus or an improved or alternative method of driving a fastener or performing a friction stir spot welding or clinching operation.

SUMMARY

Throughout this specification, the term "comprising" or "comprises" means including the component(s) specified but not to the exclusion of the presence of others.

Optional and/or preferred features as set out herein may be used either individually or in combination with each other where appropriate and particularly in the combinations as set out in the accompanying claims. The optional and/or preferred features for each aspect of the invention set out herein are also applicable to any other aspects of the invention, where appropriate.

According to a first aspect of the present invention there is provided a spot-joining apparatus comprising: a motor; a punch for driving a fastener or performing a clinching or friction stir spot welding operation; a first transmission configured to transfer rotary motion of the motor to the punch when engaged; a second transmission configured to convert rotary motion of the motor to linear motion of the punch, and thereby drive the punch towards a workpiece, when engaged; and a transmission control apparatus arranged to selectively adjust the degree of engagement of at least one of the first and second transmissions.

The apparatus having a single motor which can produce both the rotary and linear motion has a number of advantages. Incorporating a single motor may not only make the apparatus cheaper than an equivalent apparatus with two motors, but may also make it lighter and less bulky. The decreased weight may allow lighter built and less powerful robotic arms or other types of automation to be used, which may themselves be cheaper, lighter and/or less bulky. An apparatus of less bulk may also be beneficial in allowing it to reach into smaller spaces. Additionally, the apparatus comprising a single motor may increase or simplify the service life and/or decrease the maintenance cost of the apparatus. Furthermore, utilisation of a single motor may advantageously simplify control of the apparatus. For instance, where the apparatus is computer controlled, the control algorithm may be of reduced size and/or complexity compared to one which must control multiple individual motors. This may be especially advantageous in situations where otherwise the actions of multiple motors must be co-ordinated (for instance in respect of their speeding up or slowing down, or where the action of one motor alters the loading placed on the other).

The transmission control apparatus may be arranged to selectively adjust the degree of engagement of both the first and second transmissions. Alternatively or in addition, the transmission control apparatus may be arranged to selectively adjust the degree of engagement of said transmission or transmissions to any degree of engagement within the operable range of the transmission.

The transmission control apparatus may be arranged to selectively adjust the degree of engagement of said transmission or transmissions between fully disengaged and fully engaged states.

The second transmission may comprise a first threaded member connected to the motor and a second threaded member connected to the punch, the threads of the first and second threaded members being arranged to directly or indirectly act on each other to convert rotation of the first threaded member relative to the second threaded member into linear motion of the second threaded member. The second transmission may further comprise one or more intermediate threaded members each in threaded engagement with both the first and second threaded members, the first and second threaded members being configured to act on each other through the one or more intermediate threaded members.

Where this second transmission comprises a first threaded member and a second threaded member (whether or not it also comprises one or more intermediate threaded members, and where the transmission control apparatus is arranged to selectively adjust the degree of engagement of both the first and second transmissions, the transmission control apparatus may be configured to engage the first transmission by rotationally coupling the first and second threaded members so as to restrict relative rotation therebetween, and be configured to engage the second transmission by restricting rotation of the second threaded member so that relative rotation of the first and second threaded members takes place. In one embodiment where this is the case, the threads of the first and second threaded members may be configured to rotationally couple the first and second threaded members through frictional resistance therebetween, the threads being configured to alter the degree of frictional resistance offered in response to an alteration in the axial loading of the threads.

Rotational coupling of members is used herein to refer to the rotation of one member causing rotation of the other member. Two rotationally coupled members may or may not rotate in the same direction and/or at the same angular speed.

In the above embodiment, the spot-joining apparatus may further comprise a linear brake arranged to resist axial motion of the punch and thereby apply a load to the threads of one or both of the first and second threaded members. Instead or in addition, the spot-joining apparatus may further comprise a resilient member configured to apply load to the threads of one or both of the threaded members.

Where the apparatus does comprise such a resilient member, and where the second transmission comprises one or more intermediate threaded members, the resilient member may act directly or indirectly on the intermediate threaded members. The resilient member may be configured to apply load to the threads by urging the intermediate threaded members axially relative to the first and/or second threaded members, radially towards the first or second threaded member, or in any other suitable direction.

The transmission control apparatus may comprise a clutch. The clutch may comprise a volume of magneto-rheological or electro-rheological fluid retained in a cavity between a component rotationally coupled to the motor and a component rotationally coupled to the punch, and further comprise an electric or magnetic field generator arranged to selectively apply an electric or magnetic field to the volume of fluid in order to alter the viscosity of the fluid.

Where the transmission control apparatus comprises a clutch, the transmission control apparatus may be configured to selectively adjust the degree of engagement of the first transmission by controlling the amount of slip permitted by the clutch.

The transmission control apparatus may comprise a variable-influence brake system. The variable-influence brake system may comprise a volume of magneto-rheological or electro-rheological fluid retained in a cavity between a rotationally fixed component and a rotational component, and may further comprise an electric or magnetic field generator arranged to selectively apply an electric or magnetic field to the volume of fluid in order to alter the viscosity of the fluid.

Where the transmission control apparatus comprises a variable-influence brake system, the transmission control apparatus may be configured to selectively adjust the degree of engagement of the second transmission by controlling the amount of slip permitted by the variable-influence brake system.

The apparatus may comprise a controller configured to monitor the performance of the apparatus via one or more sensors. Alternatively or in addition, the apparatus may comprise a controller configured to gather feedback on the status or dynamic performance of the apparatus via one or more sensors, and calculate and/or implement real-time adjustments to said status or dynamic performance of the apparatus.

The apparatus may be configured to be capable of accommodating the force/motion timings that may be required for any reasonable process profile.

The first transmission of the apparatus may comprise substantially all the components of the second transmission. This may be interpreted to mean tat the first transmission may comprise all of the components of the second transmission, or all components of the second transmission with the exception of one or more components of the second transmission which have little or no effect on its function. Alternatively, the second transmission may comprise substantially all the components of the first transmission. As another alternative, neither transmission may comprise substantially all the components of the other.

The first transmission and the second transmission may be substantially the same entity.

According to a second aspect of the invention there is provided a spot-joining apparatus comprising: a punch for driving a fastener or performing a clinching or friction stir spot welding operation; and an upsetting die counterposed with the distal end of the punch, at least a portion of the upsetting die being selectively rotatable.

Part of the die being selectively rotatable may allow the die to perform frictional heating on the opposite side of the workpiece to the fastener or punch, instead of or in addition to frictional heating of the workpiece by the fastener or punch. This greater control over the areas of the workpiece which experience frictional heating may allow satisfactory adherence to the different requirements for penetration of layers of different materials to be satisfied. For instance, it may allow only the bottom layer of a workpiece to be heated, whereas if the heating was applied by the fastener, the other layers (which would also be in contact with the fastener) would also be heated. In addition, being able to heat the workpiece on the opposite side to the fastener may speed up the fastening process in situations where all layers or at least the outer layers of the workpiece are to be directly heated, as heat can be applied on both sides of the workpiece simultaneously.

The upsetting die may comprise a central portion surrounded by a peripheral ring, the central portion being selectively rotatable and the peripheral ring being rotationally fixed. The central portion may be movable between an extended position and a retracted position relative to the peripheral ring. The central portion may be selectively rotatable in both the extended position and the retracted position.

According to a third aspect of the invention there is provided a method of driving a fastener or performing a clinching or friction stir spot welding operation, the method comprising: bringing the fastener or a punch into contact with a workpiece; causing the fastener or punch to rotate under action of a first transmission, the first transmission transferring rotary motion of a motor to the fastener or punch when engaged; and driving the fastener or punch into the workpiece under action of a second transmission, the second transmission translating rotary motion of said motor into linear motion of the fastener or punch when engaged, wherein the degree of engagement of at least one of the first and second transmissions is selectively adjusted by a transmission control apparatus.

In addition to the advantages already discussed in relation to the first aspect of the invention, the method of the third aspect of the invention may provide further improvements in relation to driving fasteners in particular. For instance, rotating the fastener so as to soften the workpiece through frictional heating may allow fasteners such as self-piercing rivets to be used with workpiece materials that would be too hard or brittle at room temperature. Similarly, the softening of the workpiece may allow a softer or more brittle fastener to be used than would be possible at room temperature. This greater flexibility in choice of fastener material could allow other fastener properties such as lightness or corrosion resistance to be more fully optimised. Frictional heating of the fastener may improve its ductility, allowing brittle materials to become temporarily more ductile and hence more formable. This may reduce the force required to deform the fastener within the material.

The degree of engagement of both the first and second transmissions may be selectively adjusted by the transmission control apparatus.

The fastener or punch may be caused to rotate before and/or simultaneously as and/or after it contacts the workpiece.

The fastener or punch may be rotated throughout its travel into the workpiece. The fastener or punch may instead not be rotated while it is driven into the workpiece. Alternatively, the fastener or punch may be rotated during a part of its travel into the workpiece and not rotated during another part of its travel into the workpiece.

The punch may perform a clinching operation, or may instead perform a friction stir spot welding operation.

The performance of an apparatus used in the method may be monitored by a controller via one or more sensors. Alternatively or in addition, feedback on the status or dynamic performance of an apparatus used in the method may be gathered by a controller through one or more sensors, the controller calculating and/or implementing real-time adjustments to said status or dynamic performance of the apparatus.

The degree of engagement of at least one of the first and second transmissions may fluctuate in response to changes in the forces exerted on the fastener or punch by the workpiece due to resistance to deformation of the workpiece.

According to a fourth aspect of the present invention there is provided a method of driving a fastener or performing a clinching or friction stir spot welding operation, the method comprising: bringing the fastener or a punch into contact with a workpiece; selectively rotating at least a portion of an upsetting die counterposed with the fastener or punch; and driving the fastener or punch into the workpiece.

The portion of the upsetting die which rotates may be caused to rotate before and/or simultaneously as and/or after it contacts the workpiece.

The punch may perform a clinching operation, or may perform a friction stir spot welding operation.

According to a fifth aspect of the present invention there is provided a spot-joining apparatus comprising:
 a motor;
 a punch for driving a fastener or performing a clinching or friction stir spot welding operation;
 a multifunctional transmission configured to perform a first function, which is to transfer rotary motion of the motor to the punch, and a second function, which is to convert rotary motion of the motor to linear motion of the punch; and
 a transmission control apparatus arranged to selectively adjust the degree to which the multifunctional transmission performs at least one of the first and second functions.

For the avoidance of doubt, the multifunctional transmission may comprise features or components which are involved in performing one of the first and second functions but not the other. Further, the spot-joining apparatus may comprise additional mechanisms by which rotary motion of the motor can be transferred or converted into rotary or linear motion of the punch.

The transmission control apparatus may be arranged to selectively adjust the extent to which the multifunctional transmission performs the first function, the second function, or both functions.

The extent to which the multifunctional transmission performs each function may be entirely independent (i.e. the extent to which it performs the first function may be unaffected by the extent to which it is performing the second function, and vice versa). Alternatively, the extent to which the multifunctional transmission performs the first function may be partially or entirely dependent on the extent to which it is performing the second function, and/or vice versa. For example, the extent to which the multifunctional transmission performs one of the first and second functions (as a proportion of its total capacity to do so) may be the reciprocal of the extent to which it is performing the other. In such a case, a reduction in the extent to which the multifunctional transmission is performing one function would lead to a corresponding increase in the extent to which it performs the other.

In one embodiment of the fifth aspect of the invention:
 the multifunctional transmission comprises a first threaded member connected to the motor and a second threaded member connected to the punch;
 the threads of the first and second threaded members are configured to directly or indirectly act on each other to convert rotation of the first threaded member relative to the second threaded member into linear motion of the second threaded member, thereby performing the second function of the multifunctional transmission; and
 the first and second threaded members are configured to be rotatably coupled such that rotation of the first threaded member causes rotation of the second threaded member, thereby performing the first function of the multifunctional transmission.

One or more of the optional features set out herein in relation to the first aspect of the invention may be utilised in relation to the fifth aspect of the invention. For example, one or more of the optional features described in relation to the first and/or second transmissions of the first aspect of the invention may be applicable to the multifunctional transmission of the fifth aspect of the invention. As another example, one or more of the optional features described in relation to the transmission control apparatus of the first aspect of the invention may be applicable in relation to the transmission control apparatus of the fifth aspect of the invention.

According to a sixth aspect of the present invention there is provided a method of manufacturing a product, the method comprising fastening together two or more layers of a workpiece using the apparatus of the first, second or fifth aspect of the invention.

According to a seventh aspect of the present invention there is provided a product comprising a workpiece formed from two or more layers fastened together using the apparatus of the first, second or fifth aspect of the invention, and/or the method of the third or fourth aspect of the invention.

In relation to the sixth and seventh aspects of the invention, the product may be a vehicle (such as a motorcycle, car, van, lorry or aircraft). Examples of layers of a workpiece include the chassis of a vehicle, thermal/acoustic insulation panels and vehicle bodywork panels.

The described and illustrated embodiments are to be considered as illustrative and not restrictive in character, it being understood that only the preferred embodiments have been shown and described and that all changes and modifications that come within the scope of the invention as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

DETAILED DESCRIPTION

Specific embodiments of the present invention will now be described, by way of example only, with reference to the accompanying drawings in which:

FIG. 14 is a series of cross-sectional side views of stages in a friction stir clinching operation according to a fifth embodiment of the invention;

FIG. 15 is a cross-sectional side view of an alternative upsetting die for the friction stir clinching operation according to the fifth embodiment;

Figure 1:
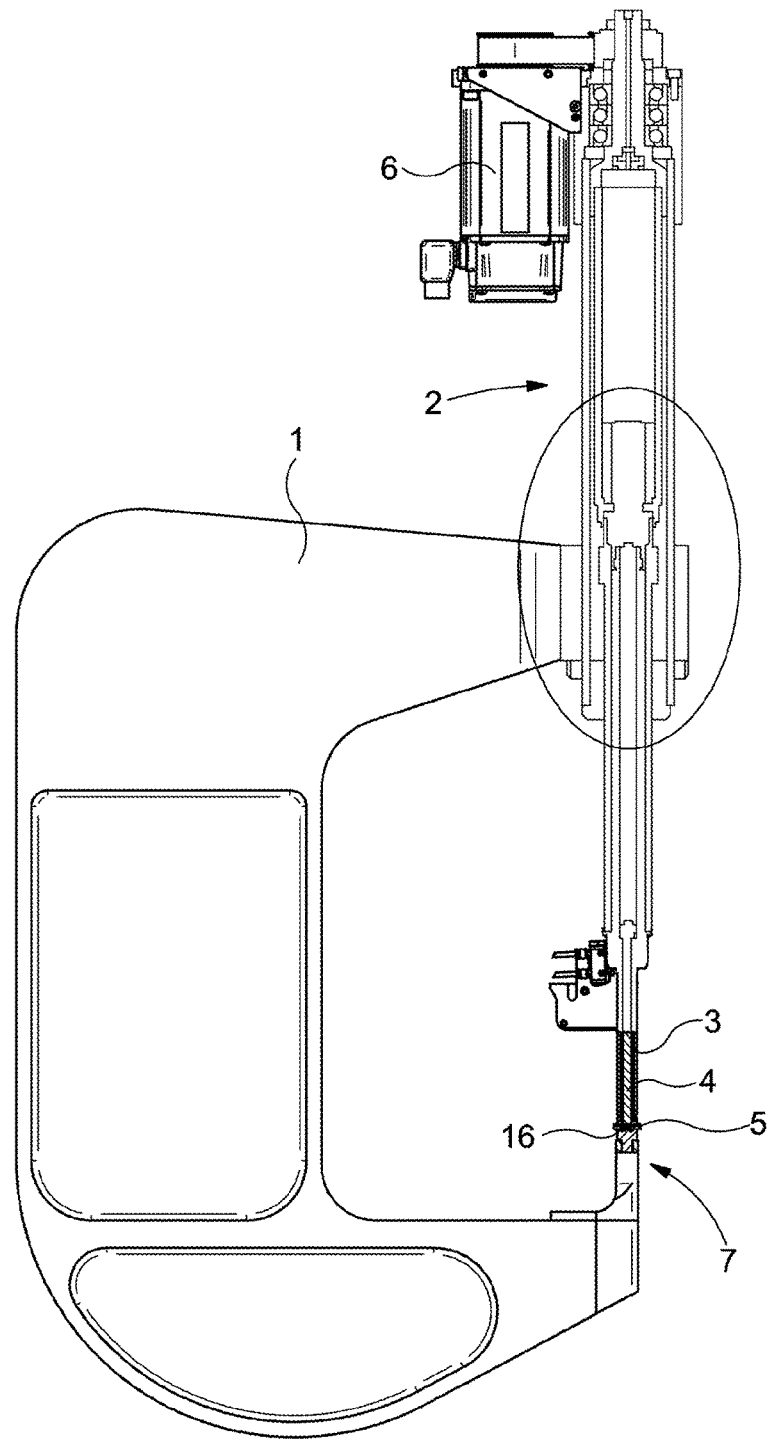
FIG. 1 is a partial cross-sectional side view of an apparatus according to a first embodiment of the invention.

Referring now to the drawings, FIG. 1 shows the layout of a self-piercing rivet driving apparatus of a first embodiment of the invention, which may be an example of a friction stir spot-joining apparatus according to the first aspect of the invention. The apparatus has a C-frame 1, which is fitted to the end of a robotic arm (not shown). On one end of the C-frame 1 is a rivet driving assembly 2, a nose 3 of which houses a punch 4 for driving a rivet 16 into a workpiece 5. The punch 4 is capable of both linear and rotational motion, the punch 4 in either case being driven by a single motor 6, as outlined below. On the other end of the C-frame, counterposed with the punch 4, is an upsetting die 7. In FIG. 1 the nose 3 and punch 4 are shown extended (e.g. having just driven a rivet 16 into a workpiece 5)

Figure 2:
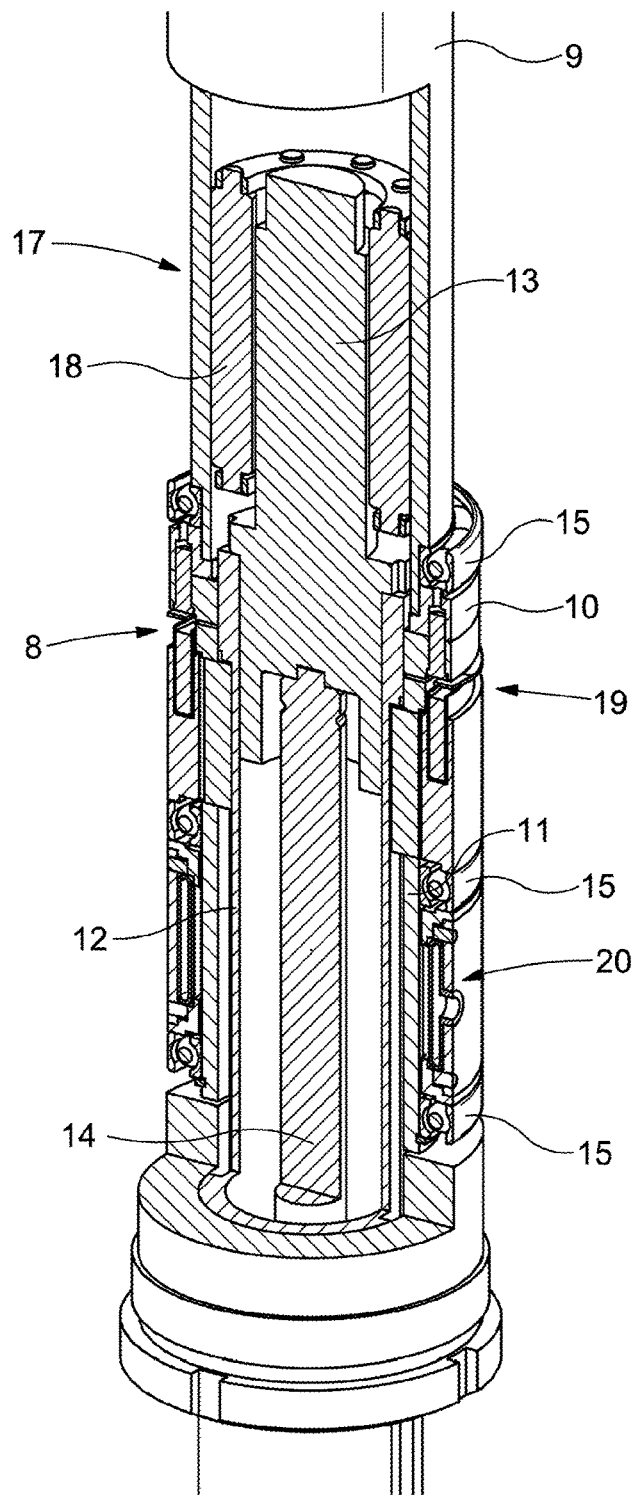
FIG. 2 is a partial cutaway perspective view of part of the apparatus of the first embodiment, showing first and second transmissions and a transmission control apparatus.

FIG. 2 shows the circled area of FIG. 1 in more detail (the C-frame is not shown). A first transmission 8 is configured to enable the punch 4 to rotate by transferring rotary motion of the motor 6 to the punch 4 when the first transmission is engaged by a transmission control apparatus. The first transmission 8 comprises a roller nut tube 9, clutch engagement block 10, rotating bush 11, keyed tube 12, roller screw 13 and plunger 14. The clutch engagement block 10 is a substantially annular component rotationally fixed to the roller nut tube 9 so that rotation of the roller nut tube causes the clutch engagement block 10 to rotate. The rotating bush 11 is a substantially tubular component which is unable to move axially but is able to rotate. The keyed tube 12 is a substantially tubular component which is arranged to transmit a braking force (discussed below) and act as a guide member for the components received within its bore. The keyed tube 12 is movable both rotationally and linearly. It is rotationally fixed to the rotating bush 11, but is able to slide axially within it. The plunger 14 is an elongate member which links the punch 4 to the roller screw 13, transferring rotary and/or linear motion therebetween. The components of the first transmission 8 are arranged co-axially and concentrically to minimise the space taken up by the first transmission, and are supported by bearings 15.

To rotate the punch 4, the roller nut tube 9, clutch engagement block 10, rotating bush 11, keyed tube 12, roller screw 13 and plunger 14 are rotationally coupled (explained in more detail below). By doing so, rotation of the roller nut tube 9, which is driven by the motor 6, causes the plunger 14 to rotate. The punch 4 is mounted to the plunger 14 so that rotation of the plunger 14 causes the punch to rotate as well. The punch 4 is provided with a set of radial grooves (not visible) on its tip, which engage with complementary radial ridges (not visible) on the head of a rivet 16 held by the punch, so that the rivet 16 is rotated when the punch is rotated.

FIG. 2 also shows a second transmission 17, which is configured to enable the punch 4 to move linearly by translating rotary motion of the motor 6 into linear motion of the punch 4 when the second transmission is engaged by the transmission control apparatus. In this embodiment, the second transmission 17 takes the form of a roller screw mechanism. The second transmission 17 comprises the roller nut tube 9, the roller screw 13 and a plurality of threaded rollers 18. The roller nut tube 9 is an example of a first threaded member, the roller screw 13 is an example of a second threaded member and the rollers 18 are examples of intermediate threaded members. The threads of the roller nut tube 9 and roller screw 13 are arranged to act indirectly on each other through the threaded rollers 18. This action translates rotation of the roller nut tube 9 (which is driven by the motor 6) relative to the roller screw 13 into linear motion of the roller screw 13 (which is connected to the punch 4 via the plunger 14).

Figure 3:
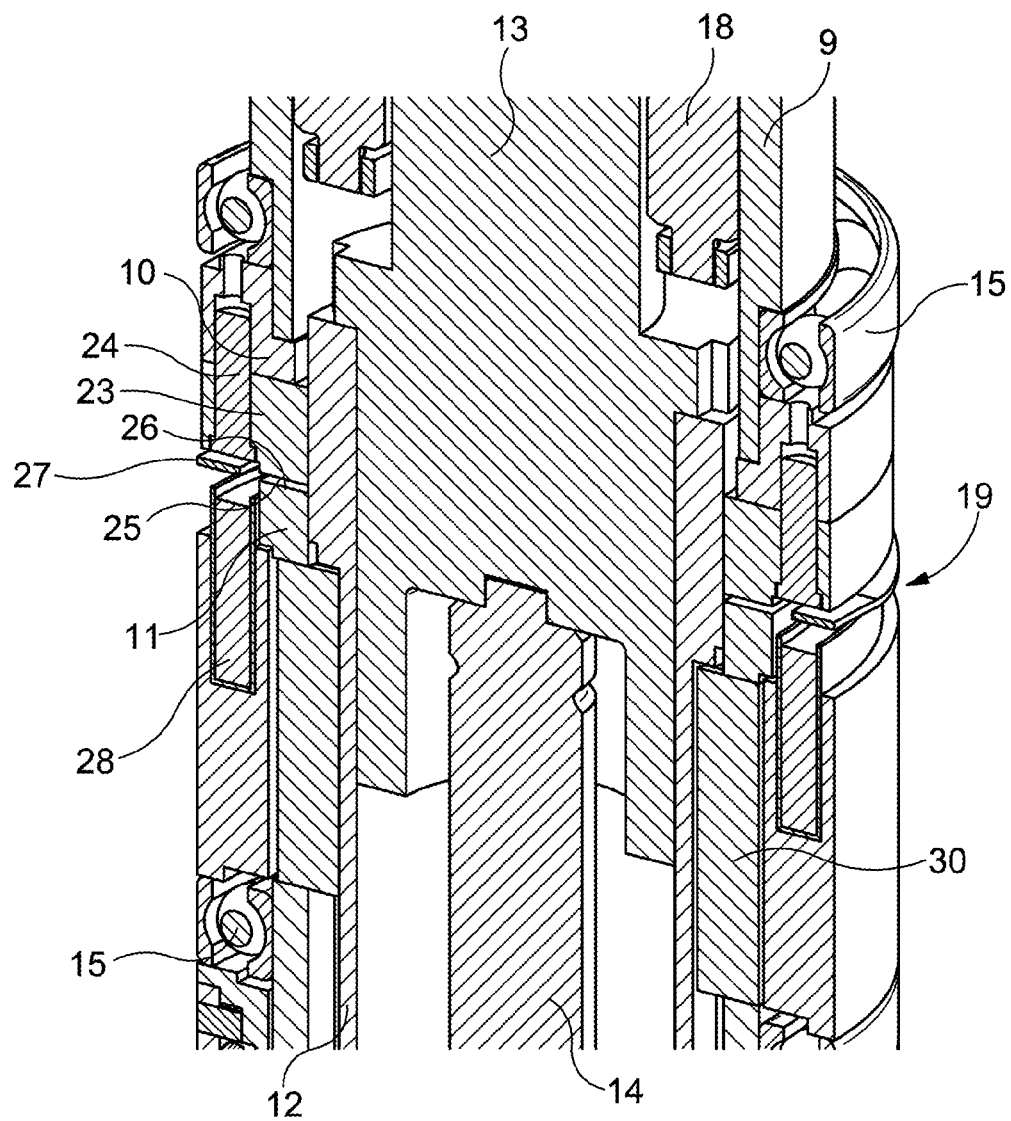
FIG. 3 is a cutaway perspective view of a clutch of the first embodiment.
Figure 4:
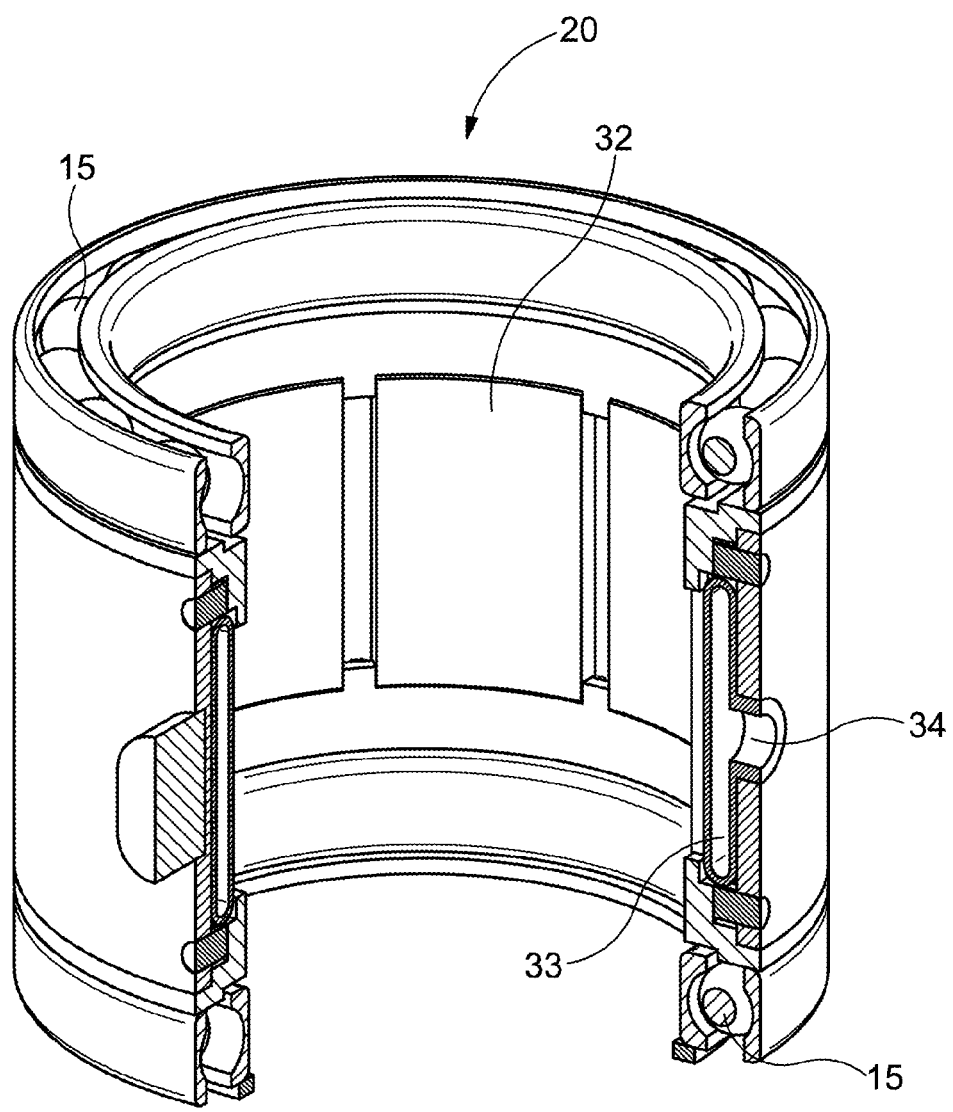
FIG. 4 is a cutaway perspective view of a variable-influence brake system of the first embodiment.

A transmission control apparatus of this embodiment comprises a clutch 19 and a variable-influence brake system 20, shown in more detail in FIGS. 3 and 4 respectively. The rotational movement of the punch 4 is controlled through the clutch 19 and the linear motion of the punch is controlled by the variable-influence brake system 20, as outlined below. Through the variable-influence brake system 20 and the clutch 19, the transmission control apparatus can selectively adjust the degree of engagement of the first and the second transmissions 8, 17. It is able to adjust the degree of engagement of each transmission to any degree of engagement between fully disengaged (i.e. the transmission has no effect) and fully engaged (i.e. all rotary motion of the motor is transferred/converted by the transmission), as explained below.

The clutch 19 comprises a friction plate 23 attached to the clutch engagement block 10 by pins 24 which permit axial movement of the friction plate 23 but prevent any substantial relative rotation between the friction plate 23 and the clutch engagement block 10 (which, in turn, is rotationally fixed to the roller nut tube 9). The friction plate 23 has a friction surface 25 which faces an opposing friction surface 26 on the rotating bush 11 (the rotating bush being axially fixed). A clutch spring 27 biases the friction plate 23 towards the clutch engagement block 10 to keep the friction surfaces 25, 26 apart. An electromagnet 28 can be selectively energised to attract the friction plate 23 towards it and bring the friction surfaces 25, 26 into contact, engaging the clutch 19.

Engaging the clutch 19 engages the first transmission 8 by rotationally coupling the clutch engagement block 10 to the rotating bush 11 through the friction plate 23. The clutch engagement block is rotationally coupled to the roller nut tube 9, which is driven by the motor 6. The rotating bush 11 is rotationally fixed with respect to the keyed tube 12 by keys 30, and the keyed tube 12 is rotationally fixed with respect to the roller screw 13. The roller screw 13 is, in turn, rotationally fixed with respect to the punch 4 through the plunger 14. Therefore, engaging the clutch 19 rotationally couples the punch 4 and the motor 6. In other words, when the clutch 19 is engaged the roller nut tube 9 is rotationally coupled to the roller screw 13 (through the clutch engagement block 10, friction plate 23, rotating bush 11 and keyed tube 12). The relative rotation permitted between the roller nut tube 9 and roller screw 13 is therefore restricted, ensuring that at least a portion of the rotary motion of the motor 6 is not converted to linear motion of the punch 4 by the second transmission 17.

By controlling the degree of energisation of the electromagnet 28, the attractive force from the magnet 28 can be selectively varied in order to control the amount of slip that is permitted between the friction surfaces 25, 26 of the clutch 19, and thus control the degree of engagement of the first transmission 8. The amount of slip permitted by the clutch 19, and thus the degree of engagement of the first transmission 8, can be varied from no slip at all being permitted (i.e. the first transmission 8 being fully engaged) to slip being completely unrestricted (i.e. the first transmission 8 being fully disengaged), or anywhere in between (i.e. the first transmission 8 being partially engaged).

The variable-influence brake system 20, as shown in FIG. 4, comprises an array of rotationally fixed brake pads 32 positioned around a rotational component, in this case the rotating bush 11. On the far side of the brake pads 32 from the rotating bush is a flexible bladder 33 with a fluid port 34 through which a fluid such as air or oil can be introduced. Introduction of fluid into the bladder 33 causes it to expand, which forces the brake pads 32 into frictional engagement with the rotating bush 11.

Applying the brake 20 engages the second transmission 17 by restricting rotation of the roller screw 13 (by restricting the rotation of the rotating bush 11, to which the roller screw 13 is rotationally coupled). This provides relative rotation between the roller nut tube 9 (rotationally driven by the motor 6) and roller screw 13, which is converted into linear motion of the roller screw 13 by the second transmission 17. The punch 4, which is axially fixed to the roller screw 13 via the plunger 14, and the keyed tube 12 (which is also axially fixed to the roller screw 13), therefore exhibit linear motion. The direction of the linear motion depends on the direction of the threads of the roller nut tube 9 and roller screw 13, and the direction of rotation of the roller nut tube 9.

By controlling the amount of fluid in the bladder 33, the force pressing the brake pads 32 against the rotating bush 11 can be selectively varied in order to control the amount of slip that is permitted between the brake pads 32 and the rotating bush 11, and thus control the degree of engagement of the second transmission 17. The amount of slip permitted by the brake system 20 (and thus the degree of engagement of the second transmission 17) can be varied from no slip at all being permitted (i.e. the second transmission 17 being fully engaged) to slip being completely unrestricted (i.e. the second transmission 17 being fully disengaged) or anywhere in between (i.e. the second transmission 17 being partially engaged).

A method according to a second embodiment of the invention will now be described. This embodiment is an embodiment of the third aspect of the invention. The method of the second embodiment utilises the apparatus of the first embodiment, and corresponding reference numerals will be used, however it is to be understood that other embodiments of the third aspect of the invention may use equipment which falls outside the scope of the first aspect of the invention.

Referring back to FIGS. 1-4, through the brake 20 and clutch 19 the transmission control apparatus selectively adjusts the degree of engagement of the first 8 and the second 17 transmissions. The transmission control apparatus is able to adjust the degree of engagement of each transmission 8, 17 to any degree of engagement between fully disengaged (i.e. the transmission has no effect) and fully engaged (i.e. all rotary motion of the motor is transferred/converted by the transmission).

Figure 5:
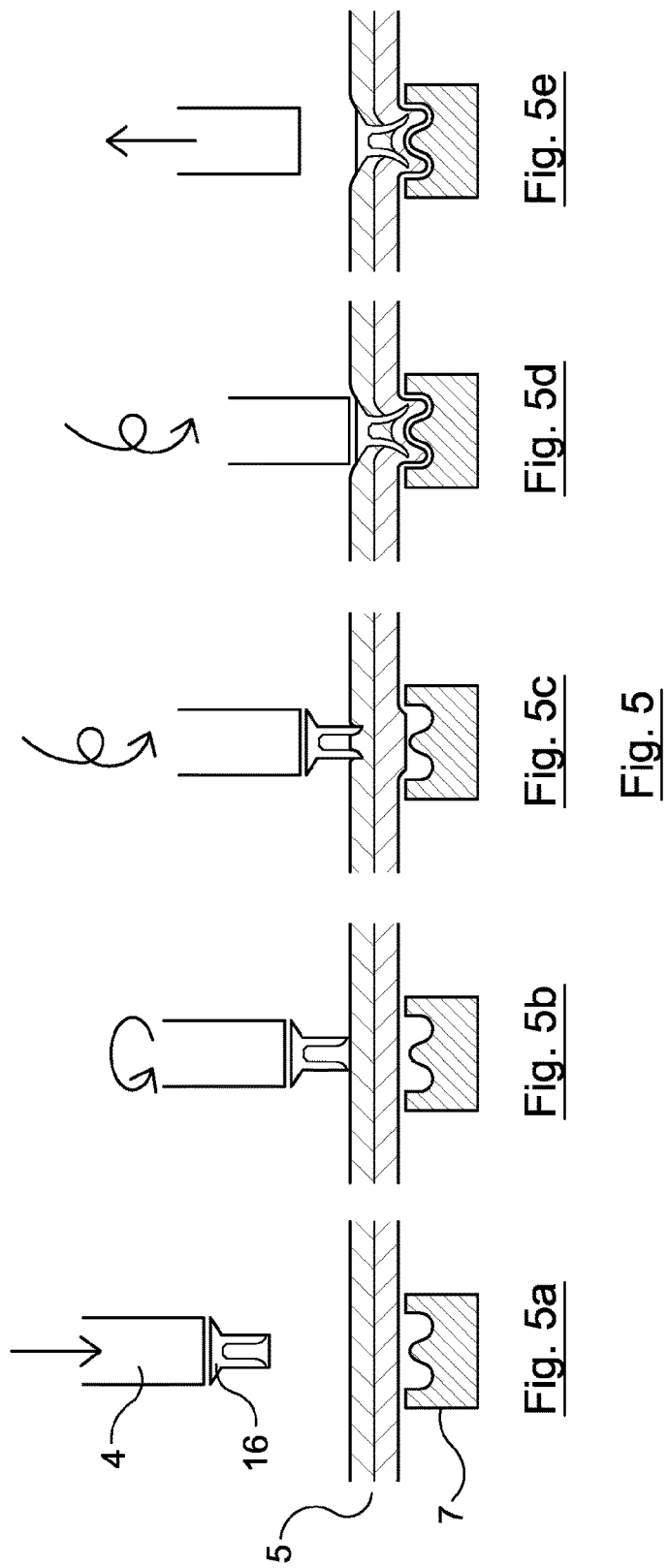
FIG. 5 is a series of cross-sectional side views of stages in a method according to a second embodiment of the invention.

FIG. 5 shows schematically the method of the second embodiment in stages shown as FIGS. 5a-5e. Referring to FIG. 5a in combination with FIGS. 1-4, to drive a rivet 16 into a workpiece 5, the rivet is mounted on the tip of the punch 4 with the radial grooves (not visible) of the punch 4 and the radial ridges (not visible) of the rivet 16 interlocking. The workpiece 5 is positioned between the punch 4 and rivet 16 and the upsetting die 7, the motor 6 is energised and the variable-influence brake system 20 of the transmission control apparatus is engaged. This restricts the slip permitted by the brake 20 (by introducing the desired quantity of fluid into the flexible bladder 33 through the fluid port 34) and engages the second transmission 17. The rivet 16 and punch 4 are therefore advanced linearly towards the workpiece 5.

When the rivet 16 contacts the workpiece 5, the variable-influence brake 20 of the transmission control apparatus is released (by allowing fluid to escape from the bladder 33 so that it can contract) to disengage the second transmission 17. Additionally, the electromagnet 28 is fully energised to press the friction surfaces 25, 26 of the clutch 19 together with full force to eliminate slip in the clutch and fully engage the first transmission 8. This causes the punch 4, and therefore the rivet 16, to rotate against the workpiece 5. The heat generated by the sliding friction between the rivet 16 and the workpiece 5 softens the workpiece 5 in the locality of the rivet (as shown in FIG. 5b).

Figure 6:
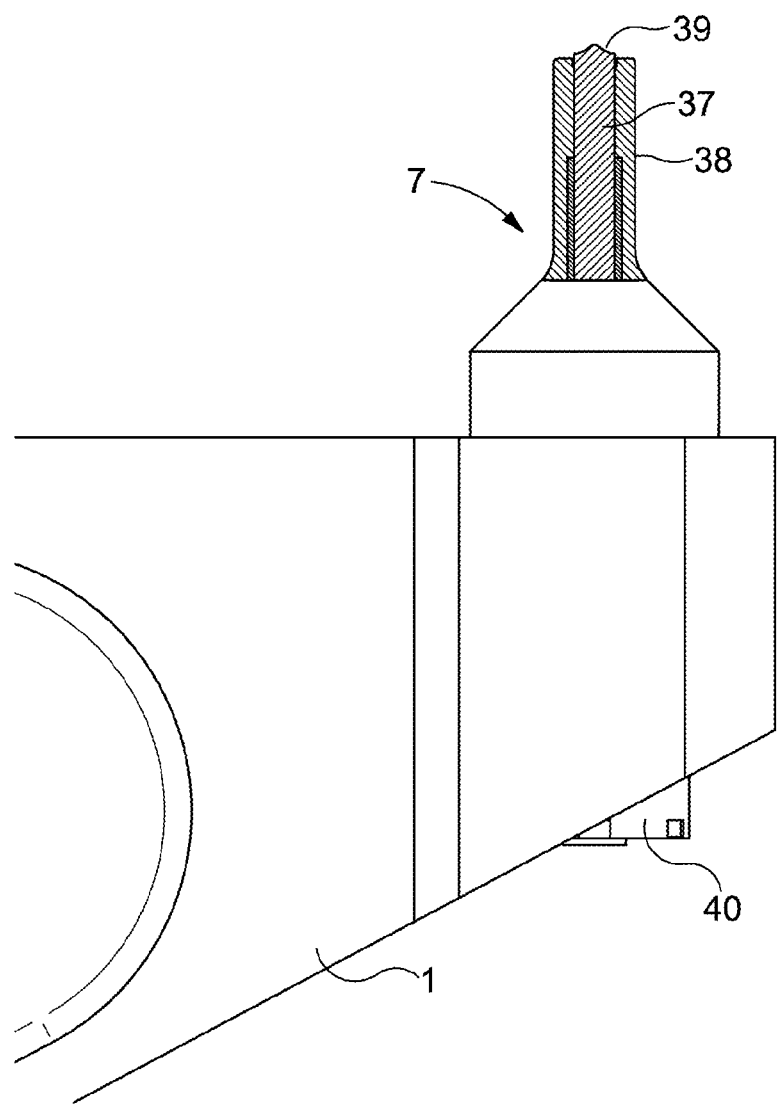
FIG. 6 is a partial cross-sectional side view of an upsetting die of a third embodiment of the invention with a central portion in an extended position.

With the clutch 19 permitting a degree of slip but maintaining the first transmission 8 in partial engagement, the variable-influence brake system 20 is applied lightly (by introducing relatively little fluid into the bladder 33) to also partially engage the second transmission 17 and drive the rivet 16 into the workpiece 5 as it rotates. This is shown in FIG. 5c. As with conventional self piercing riveting, as the rivet 16 is driven into the workpiece 5, the workpiece is deformed by the upsetting die 7 and the flow of workpiece material causes the distal end of the rivet 16 to be upset and flare outwards into the workpiece 5. This is shown in FIG. 5d. When the rivet 16 is fully inserted, the clutch 19 is fully released to disengage the first transmission 8 and the brake 20 is fully applied to fully engage the second transmission 17. The motor 6 is energised such that it rotates in the opposite direction, withdrawing the punch 4 from the workpiece 5 (as shown in FIG. 5e). A new rivet 16 is then mounted on the tip of the punch FIG. 6 shows the upsetting die 7 of a third embodiment of the invention. This embodiment is an embodiment of the second aspect of the invention. The second embodiment utilises the same rivet driving assembly as the first embodiment, and corresponding reference numerals will be used. However, other embodiments may use an apparatus which differs from that of the first embodiment. For instance, the upsetting die of the third embodiment may be utilised in combination with a conventional self-piercing riveting apparatus where the punch (and therefore the rivet 16) is driven linearly and does not rotate.

The upsetting die of the third embodiment has a central portion 37, surrounded by a peripheral ring 38. The central portion 37 and the peripheral ring 38 are arranged concentrically. In the third embodiment the tip of the central portion has a protruding upsetting pip 39, though in other embodiments the central portion may have a different profile, such as it may be domed, flat, concave or have a central depression. The peripheral ring 38 is fixed to the C-frame 1 such that it is unable to rotate. The central portion 37 is arranged to be selectively rotatable under action of a die motor 40. In the third embodiment the central portion 37 is substantially the same diameter as the rivet 16, however in other embodiments it may have a diameter smaller than that of the rivet or it may have a diameter larger than that of the rivet.

Figure 7:
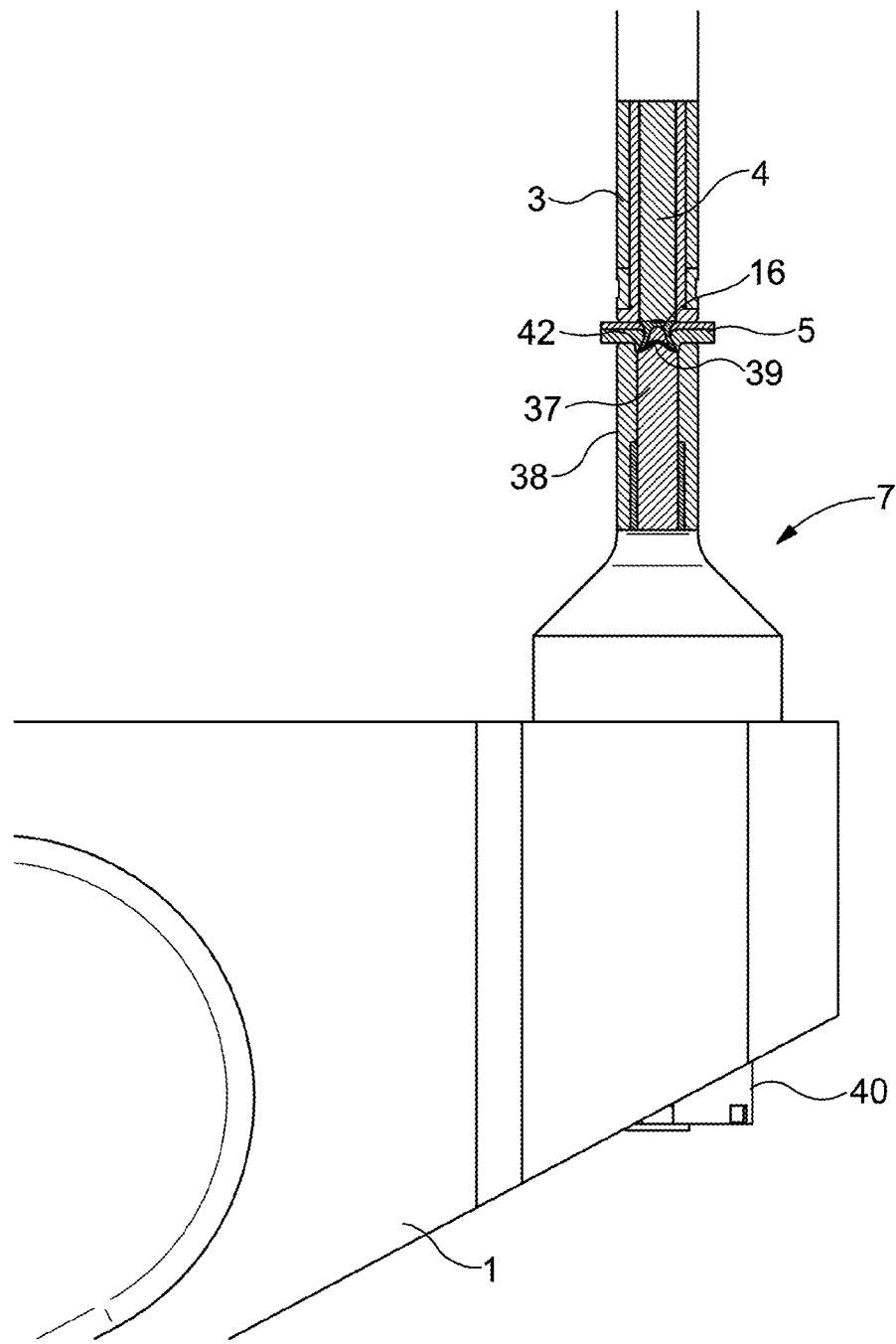
FIG. 7 is a partial cross-sectional side view of the upsetting die of the third embodiment with the central portion in a retracted position, also showing a nose, punch, c-frame and die motor of the apparatus.

In FIG. 6 the central portion 37 is shown in an extended position. The central portion 37 is arranged to be depressed to a retracted position (shown in FIG. 7) while a rivet 16 is being driven into a workpiece 5. The central portion 37 is biased to the extended position by a spring (not shown) but is arranged to be forced to the retracted position by rivet driving force from the punch 4 (acting through the rivet and workpiece 5). When the central portion 37 is in the retracted position, a cavity 42 is formed within the upsetting die between the upsetting pip 39 of the central portion 37 and a distal end of the peripheral ring 38. The upsetting pip 39 and cavity 42 serve to deform the workpiece 5 and upset the rivet 16 as outlined previously. In the third embodiment the central portion 37 is rotatable in both the extended and retracted positions, however in other embodiments it may only be rotatable in the extended position, or may only be rotatable in the retracted position.

A fourth embodiment of the invention will now be described. This embodiment is an embodiment of the fourth aspect of the invention. The method of the fourth embodiment utilises the apparatus of the third embodiment, and corresponding reference numerals will be used. However, it is to be understood that other embodiments may use equipment which falls outside the scope of the second aspect of the invention. Furthermore, as the method of driving a rivet 16 using the rivet driving assembly 2 of the first embodiment has been described in relation to the second embodiment, only the additional steps present in the method of the fourth embodiment are discussed in detail.

With the rivet 16 mounted on the tip of the punch 4 and the workpiece 5 positioned between the punch 4 and rivet 16 and the upsetting die 7, the rivet 16 and punch 4 are advanced towards the workpiece 5. When the rivet 16 contacts the workpiece 5, the central portion 37 of the upsetting die 7 (which is in the extended position due to the biasing action of the spring) begins to rotate under action of the die motor 40. Frictional heat caused by the rotation of the central portion 37 softens the workpiece 5 in the locality of the rivet 16 and upsetting die 7, and the rivet 16 is driven into the softened workpiece 5.

While the rivet 16 is being driven into the workpiece 5, the central portion 37 is forced from the extended position to the retracted position against the bias of the spring, producing a cavity 42 between the upsetting pip 39 of the central portion 37 and the distal end of the peripheral ring 38. The force from the punch 4 causes the material of the workpiece between the rivet 16 and the upsetting die 7 to be deformed (e.g. into the cavity 42, in the case of the fourth embodiment) and the flow of material causes the distal end of the rivet 16 to be upset and flare outwards into the workpiece 5. While in the retracted position as the rivet is being driven, the central portion 37 continues to rotate so as to maintain the heating (and therefore softening) effect. Rotation of the central portion 37 may also assist the flaring of the rivet 16 via a mechanism akin to metal spinning. When the rivet has been fully inserted, the punch 4 is retracted and the workpiece 5 with attached rivet 16 is removed from the upsetting die. The central portion then returns to the extended position under action of the spring.

Numerous modifications to the above described apparatus and methods may be made without departing from the scope of the invention as defined by the appended claims. For example, the apparatus may be mounted on fixed automation, a pedestal or on a counterbalanced beam arranged to allow manual positioning of the apparatus, rather than on a robotic arm.

The first transmission of any embodiment may comprise less than all of the components listed previously, or may comprise other components in addition to those listed instead or in addition. The first transmission may also take any other suitable form, such as a coaxial or radially offset simple gearbox, epicyclic gearbox, pulley assembly or harmonic drive.

Furthermore, although in the first embodiment the punch rotationally drives the rivet via radial grooves in the punch which engage with complementary radial ridges in the rivet head, any other suitable interface means may be used. For instance, the head of the rivet may have radial grooves and the punch radial ridges, or the punch and rivet may interface via a single shaped protrusion and recess (such as a Phillips, hex or torx drive) or via multiple complimentarily shaped and spaced protrusions and recesses.

It should be noted that kinetic energy of the apparatus, rather than torque from the motor, may be used to provide some or all of the rivet driving force or rotational force. For instance, the roller nut tube may progressively speed up and gather angular momentum while the punch and rivet are advanced linearly towards the workpiece. When the rivet contacts the workpiece and experiences rotational and linear resistance to its movement, the kinetic energy of the spinning roller nut tube can be transferred to the punch to supplement (or replace) the force from the motor and drive the rivet into the workpiece. Use of kinetic energy to provide at least some of the driving or rotational force may allow less powerful motors (and gearing, where used) to be employed, which may be cheaper and/or lighter and/or have a lower power consumption. Embodiments which utilise kinetic energy to provide some of the riveting force may utilise a flywheel to store the required kinetic energy. Utilising rotational kinetic energy may be particularly advantageous because the speed of the linear motion that is produced by rotational kinetic energy may be controlled by the transmission control apparatus. Since different materials react differently to slow or fast strain rates, the ability to control the linear speed of the punch may increase the versatility of the apparatus or process.

Alternatively or in addition, torque from the motor may provide some or all of the riveting force directly. For instance, if pauses in the process profile (as discussed below) are required, this may necessitate the dissipation of the kinetic energy of the apparatus in order to bring the apparatus to a halt, the kinetic energy being built up again after the pause. The dissipation and building up of excess kinetic energy may put strain on the apparatus (requiring it to be more heavily built or serviced more often) or may slow the riveting process down. In some embodiments therefore, it may be preferable to use torque directly transferred from the motor to provide all necessary force and to minimise the kinetic energy that can build up in the apparatus.

Although the second transmission of the first embodiment is a roller screw, it may instead take the form of a ball screw, a lead screw or any other suitable mechanism. For the avoidance of doubt, pre-loading of the threads of a ball screw mechanism may also be performed, for instance by urging the balls axially or radially (e.g. by applying, to the ball raceway of the ball screw, one of the concepts described above in relation to the cage of a roller screw mechanism). Also, while the second transmission of the first embodiment uses an axially short screw movable inside an elongate tubular nut, it may instead utilise the more conventional arrangement of an axially short nut movable along an elongate screw shaft. However, the former arrangement may allow simpler braking mechanisms to be used to restrict rotation of the axially movable component. In addition, the internally threaded component being the driving component allows extra mass to be placed around its perimeter in order to increase its moment of inertia. This may be advantageous if the apparatus is to utilise kinetic energy to supply some of the rivet driving force, as discussed above.

In an embodiment, in terms of the axial force with which a fastener may be driven, a force of 1-4 kN may be suitable. This may be sufficient to drive the fastener into the workpiece once the workpiece has been adequately softened by frictional heating. However, forces up to 10 kN may be utilised for friction stir spot welding. If a process involves a step where a self-piercing rivet is driven conventionally (i.e. driven through a workpiece layer which has not been softened by frictional heating), driving forces of up to 80 kN may be used. Rotational speeds of 1000-3000 RPM may be used for friction stir welding or clinching. Rotational speeds between 3000 and 12000 RPM may be used for riveting. In an embodiment, threads of a relatively high lead may be provided within the second transmission, in order to provide faster linear motion when engaged. A lead of 15 mm or more, preferably 50 mm or more and more preferably 100 mm or more, may be particularly suitable. Relatively coarse threads, such as those with a pitch of 5 mm or more, may be preferable in some embodiments. While the features and parameters of the invention may depend on such factors as a required process profile and the materials of a workpiece and fastener (if appropriate), the above guidelines are presently deemed to be preferred.

In the context of the first and second embodiments, the term 'variable-influence brake system' may be interpreted as a brake system in which the amount of slip the brake permits can be varied according to how firmly the brake is applied. In other words, the braking force it applies can be controlled to a greater extent than simply on/off. However, a variable-influence brake system may be controlled by the transmission control apparatus such that it is only capable of permitting no slip or providing no restriction to slip.

The variable-influence brake system of the first embodiment may comprise a single brake pad rather than a plurality of pads in an array. The brake may take the form of an electromagnetic generator, an eddy current brake or an electromechanically activated wrapped spring brake. The brake may comprise a volume of magneto-rheological or electro-rheological fluid retained in a cavity between a rotationally fixed surface and a rotational component. In such an arrangement, the resistance to 'slip' (as defined below) of the brake may be controlled by the application of a magnetic or electric field to the fluid to vary the viscosity of the fluid. Alternatively, the variable-influence brake system may take any other suitable form. Also, the rotational component acted on by the brake may, instead of being a rotating bush, be the punch, the plunger, the keyed tube, or any other suitable component (whether present in the aforedescribed embodiments or otherwise).

The clutch of the first embodiment may also utilise a volume of magneto-rheological or electro-rheological fluid. The fluid may be retained in a cavity between a component rotationally coupled to the motor and a component rotationally coupled to the punch. The resistance to slip of the clutch may be controlled by the application of a magnetic or electric field to the fluid to vary the viscosity of the fluid and therefore the degree of 'slip' permitted by the clutch. In some embodiments, both the brake and clutch may utilise volumes of magneto-rheological or electro-rheological fluid which may be axially adjacent to each other. Alternatively, the clutch may utilise friction surfaces as described previously, but the friction surfaces of the clutch may be tubular and act around the circumference of the rotating bush (or alternative component), rather than being planar and acting on the end of the rotating bush (or alternative component). Instead or in addition, the clutch may utilise electromagnetic resistance. The rotor and armature windings of such a clutch may be planar and act on the end of the rotating bush (or other component), or may be tubular and act around the circumference of the rotating bush (or alternative component).

Where the application refers to 'slip' of a brake or clutch, it is to be understood that in the case of a brake or clutch utilising electromagnetic resistance or magneto-rheological or electro-rheological fluid, the 'slip' of the brake or clutch refers to the degree of relative motion of the components that is permitted by the brake or clutch.

In alternative embodiments of the second aspect of the invention, the peripheral ring may be rotatable instead of the central portion, or both the central portion and peripheral ring may rotate (either in the same direction or in opposite directions). Similarly, the peripheral ring may be movable between an extended and a retracted position instead or as well as the central portion. The upsetting die may take a different form, some or all of the upsetting die being selectively rotatable. For instance, the die may be completely flat or may be concave. Such upsetting dies may have a central portion and/or a peripheral ring that is rotatable, or may be rotatable in their entirety. Instead or in addition, they may have a central portion and/or peripheral ring that is movable between an extended and a retracted position. Rather than being biased by a spring, the central portion (or an equivalent feature in a different upsetting die) may be actively raised and lowered via a mechanism such as an actively controlled cam and follower.

In alternative embodiments of the third aspect of the invention, the punch and rivet may begin to rotate before the rivet contacts the workpiece. This may allow the rivet to reach the required rotational speed before contacting the workpiece, which may speed up the process cycle time. In such embodiments, before the rivet contacts the workpiece the brake may be partially released so that it is applied only lightly, so that the second transmission is only partially engaged. In addition, the friction surfaces of the clutch may be pressed together lightly by the electromagnet to also partially engage the first transmission. The rivet would therefore be advanced into contact with the workpiece by the motor through the second transmission, while being rotated by the motor through the first transmission. Beginning rotation of the rivet before it contacts the workpiece by partially engaging the first transmission and partially disengaging the second transmission could cause the linear advance of the rivet towards the workpiece to slow down. This may be advantageous in that the rivet would be brought into contact with the workpiece more gently. In other embodiments however, it may be advantageous for the rivet to begin rotating after contacting the workpiece (as described in relation to the second embodiment) or for the rivet to begin rotating simultaneously as it contacts the workpiece. This may be advantageous if the time gained by the rivet being already rotating when it contacts the workpiece does not recoup the time lost by the rivet's slower advance towards the workpiece.

In some situations it may be desirable to adapt an apparatus according to the first aspect of the invention such that the rotational coupling between the motor and the punch is performed partially or entirely by friction between the threads of the components of the second transmission. In one example of an apparatus where the rotational coupling is performed by the threads of the second transmission, the apparatus corresponds to that of the first embodiment except that the clutch has been eliminated. In this arrangement the components of the first transmission are the same as the components of the second transmission (that is to say the roller nut tube, threaded rollers, roller screw and the plunger). In other words, the first transmission and second transmission are the same entity. That is, the roller nut tube, threaded rollers, roller screw and plunger transfer rotary motion to the punch (first transmission) and also translate rotary motion into linear motion of the punch (second transmission). In one example of the use of such an apparatus, to advance the rivet the brake is applied lightly to partially engage the second transmission with the first transmission also partially engaged. The punch (and rivet) therefore rotates and advances towards the workpiece. When the rivet touches the workpiece, the axial loading in the threads of the second transmission is increased dramatically. The increase in axial loading leads to a dramatic increase in friction in the threads of the roller screw mechanism, which causes the punch and rivet to rotate faster (i.e. the first transmission is more fully engaged). The brake is then released entirely so that the rivet rotates on the surface of the workpiece (i.e. the second transmission is fully disengaged and the first transmission is fully engaged). Once the workpiece has softened sufficiently, light brake is reapplied. The brake permits a degree of slip but applies some resistance, thereby allowing some rotation but also promoting some linear movement (i.e. both the first and second transmissions are partially engaged). The rivet is thus driven into the workpiece as it rotates.

Where the rotational coupling between the motor and the punch is performed partially or entirely by friction between the threads of the second transmission (whether or not the clutch is eliminated as described above), the brake may be pre-set to an intermediate degree of engagement throughout insertion of the rivet. This can allow the degree of softening undergone by the region of the workpiece being penetrated by the rivet to determine the speed of rivet insertion. As stated previously, increased axial loading in the threads of the roller screw mechanism causes more friction between the threads and urges the rivet to rotate more strongly. When the rivet first contacts the workpiece the axial resistance from the workpiece is high, so the rivet experiences largely rotational motion with little or no linear motion (the effect of the brake being largely or entirely overridden by the rotational coupling through the threads). The rivet therefore rotates at the surface of the workpiece and heats the material. When the material at the surface of the workpiece softens due to frictional heating, the axial resistance offered by the workpiece decreases and thus the friction between the threads decreases similarly. The rotational motion of the rivet is therefore reduced, the linear motion of the rivet increases (due to the effect of the brake), and the rivet is driven into the workpiece. As the rivet penetrates further into the workpiece it may contact cooler and harder material, at which point the axial loading would increase and the rivet would slow down axially and speed up rotationally until that material had also been adequately softened. In other words, the degrees of engagement of the first and second transmissions fluctuate in response to changes in the forces exerted on the rivet by the workpiece due to resistance to deformation of the workpiece. Such fluctuations may, however, be subject to additional control. For instance, in the case of the workpiece comprising a layer of carbon fibre composite, it may be preferable to restrain the axial motion of the punch until the workpiece has fully softened, so as to prevent the rivet rotating on the surface of the layer (while the workpiece softens) and fraying the carbon fibre threads.

In another arrangement utilising rotational coupling through the threads of the second transmission, the clutch may be retained and the variable-influence brake may be replaced by a fixed-influence brake (i.e. a brake the influence of which cannot be altered). In use, the fixed-influence brake may function in the same way as a variable-influence brake that has been pre-set to an intermediate value as outlined above. In some cases the fixed-influence brake may in fact be formed by the inherent friction within the tool, rather than it being a discrete component. In one example of such an arrangement, the apparatus corresponds to that of the first embodiment except for the above change to the brake. In this arrangement the first transmission comprises the components listed in the description of the first embodiment of the invention (the roller nut tube, clutch engagement block, rotating bush, keyed tube, roller screw and plunger). As the punch can also be rotationally driven by the motor through the second transmission, all components of the second transmission also form part of the first transmission. In other words, the first transmission comprises all the components of the second transmission. In one example of the use of such an apparatus, to advance the rivet the clutch is partially released, partially engaging the second transmission (under action of the fixed-influence brake) with the first transmission also partially engaged (due to the partial engagement of the clutch). The rivet therefore rotates and advances towards the workpiece. As outlined above, when the rivet touches the workpiece, the axial loading in the threads of the roller screw mechanism (and thus the rotational coupling provided by it) is increased dramatically. This more fully engages the first transmission and causes the punch and rivet to rotate faster, some or all of the influence of the brake being overridden by the increased rotational coupling. The rivet therefore rotates on the surface of the workpiece with little or no linear movement, until the workpiece has softened sufficiently. At this point, the axial loading in (and therefore the rotational coupling through) the threads decreases, and the rivet is driven into the workpiece by the second transmission (which is partially engaged by the brake) while it rotates under action of the first transmission (which remains partially engaged by the clutch even if the rotational coupling through the threads becomes negligible).

In a further example application of an apparatus where the rotational coupling between the motor and the punch is performed partially by friction in the threads of the roller screw mechanism, the clutch is pre-set at an intermediate degree of engagement throughout insertion of a rivet. The clutch being pre-set may be used in combination with a variable-influence brake (which may or may not be pre-set to a particular value), or a fixed-influence brake. As with pre-setting the brake, pre-setting the clutch can also allow the degree of softening undergone by the region of the workpiece being penetrated by the rivet to determine the speed of rivet insertion. In this example the extent to which the clutch remains engaged is sufficiently low that that when no external load is applied to the rivet by the workpiece, the second transmission remains partially engaged (through the influence of the brake) and so the rivet can be advanced towards the workpiece. As described above, when the rivet contacts the workpiece, the axial loading in the threads of the roller screw mechanism increases and the rivet is driven to rotate due to rotational coupling through the threads (as well as through the clutch). When the workpiece has softened sufficiently, the rotational coupling through the threads is reduced, so the rivet is driven into the workpiece.

Though the above arrangements have been described in relation to the first and second transmissions of the first aspect of the invention, these transmissions may instead be considered to form a multifunctional transmission which, under the control of the transmission control apparatus, is arranged to transfer rotary motion of the motor to the punch (a first function), and to convert rotary motion of the motor to linear motion of the punch (a second function). Such apparatus may therefore fall within the scope of the fifth aspect of the invention.

Where the above arrangements are considered to comprise a multifunctional transmission, reference to the components of the second transmission should be interpreted as reference to components of the multifunctional transmission. Similarly, reference to the degree of engagement of the first transmission should be interpreted to mean the extent to which the multifunctional transmission performs the first function, and reference to the degree of engagement of the second transmission should be interpreted to mean the extent to which the multifunctional transmission performs the second function. For instance, where the above examples describe both the first and second transmissions being engaged, this should be interpreted to mean the multifunctional transmission is performing both functions. As another example, reference to more fully engaging the second transmission with the second transmission remaining partially engaged would be interpreted to mean increasing the extent to which the multifunctional transmission performs the first function with it still performing the second function. Other discussion herein, such as that below in relation to pre-loaded threads, may be interpreted accordingly.

It should be noted that in any embodiment which utilises rotational coupling of the motor and punch through the threads of the second transmission, the degree of rotational coupling may also be affected by the properties of the fastener/punch and the workpiece. With the fastener in contact with the workpiece, resistance to rotary motion may be produced in addition to resistance to linear motion (which is what produces axial loading in the threads). In order for the axial loading in the threads to cause the rivet to rotate more quickly, the additional rotational force applied to the fastener due to the increased axial loading cannot be fully counteracted by the resistance to rotary motion offered by the rivet and workpiece. The resistance to axial and rotational motion offered by the rivet and workpiece depends on their materials and geometry (as well as their temperature).

In an apparatus which utilises rotational coupling through the threads of the second transmission, it may be desirable to introduce additional friction between the threads so as to ensure that sufficient rotational coupling can occur, or to modify the apparatus so that friction between the threads is maintained at an acceptable level in the event of wear during use. For instance, the threads of the second transmission may be pre-loaded (that is to say that the apparatus may be configured such that portions of threadedly engaged components of the second transmission are under load when no external force is applied to the punch) for this purpose.

Figure 8:
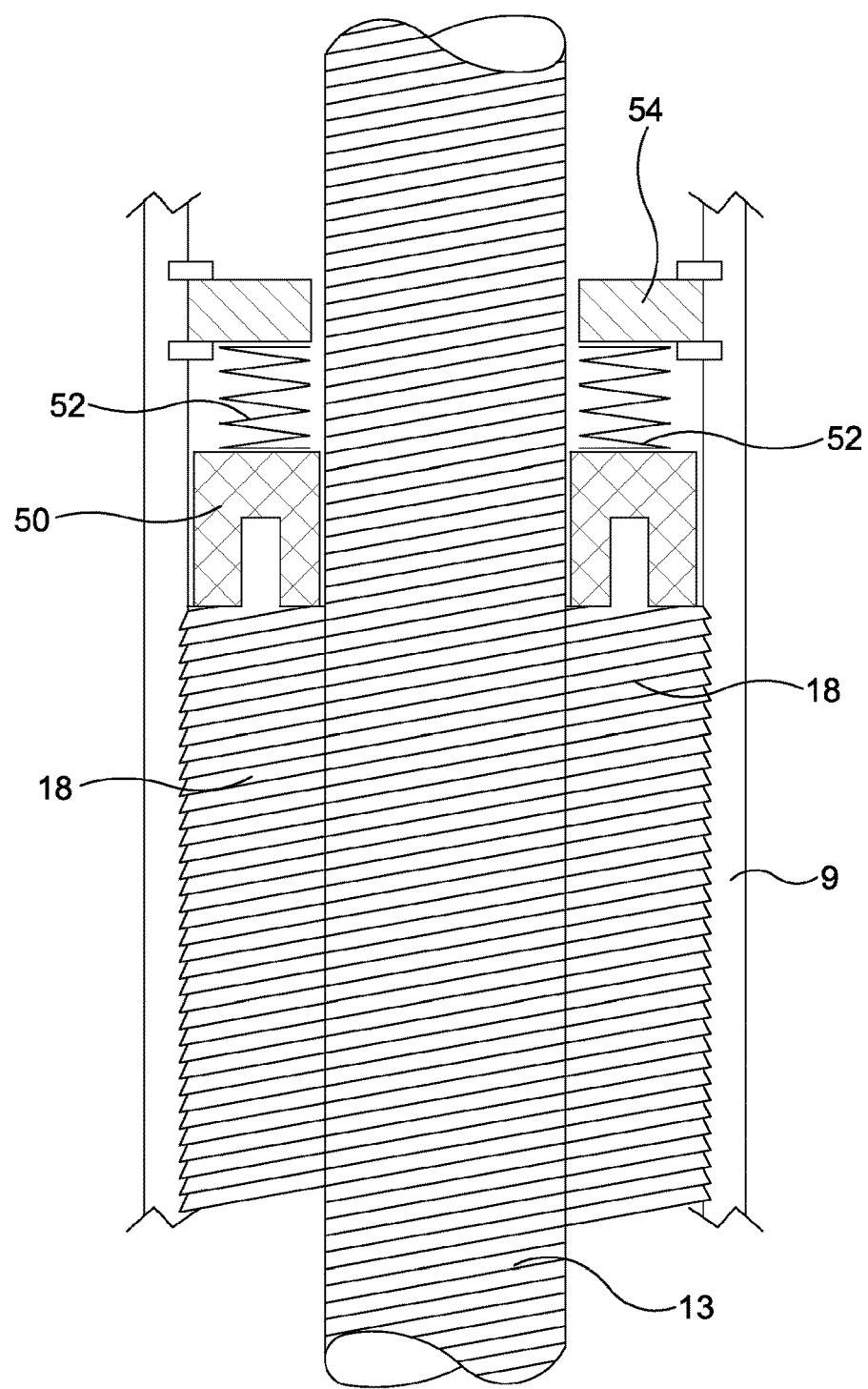
FIG. 8 is a schematic cross-sectional view of a roller screw mechanism suitable for use with the invention.

FIG. 8 shows a cross-section through part of a roller screw mechanism which includes pre-loaded threads. More specifically, the rollers are biased relative to the roller nut tube as outlined below. As with a conventional roller screw mechanism, this arrangement has a roller screw 13 concentrically received within a roller nut tube 9, with a circumferential array of threaded rollers 18 positioned between them and threadedly engaged with both. The threaded rollers 18 are held relative to one another by cages 50 (only one of which is visible) at their axial extremities. Unlike conventional designs, in which the axial position of the rollers 18 is fixed relative to either the roller screw 13 or the roller nut tube 9, in this arrangement the rollers are biased axially (downwards from the perspective of FIG. 8) relative to both. In this example, the rollers are biased by resilient elements in the form of coil springs 52, held compressed between one of the cages 50 and a retainer ring 54. In this example the rollers are axially fixed relative to the roller nut tube 9 (i.e. the roller screw 13 is axially movable relative to the rollers 18). The retainer ring 54 is therefore axially fixed relative to the roller nut tube 9. If the rollers 18 were instead axially fixed relative to the roller screw 13 however (as is the case in the first embodiment of the invention), the retainer ring 54 would be axially fixed relative to the roller screw 13. In a modification of this arrangement, the mechanism may also have a stop member positioned so as to prevent the rollers from being forced (by external loading) upwards, against the bias of the springs, to the point where the springs may be damaged or become ineffective. For example, each spring may have a rod running through its centre which, if the rollers were driven upwards, would act as a spacer and prevent the springs from being compressed any further. For the avoidance of doubt, the rollers 18 being axially fixed relative to the roller nut tube 9 would not impede the function of the invention, as rotary motion of the roller nut tube (connected to the motor) can still be converted into linear motion and/or rotary motion of the roller screw (connected to the punch).

The rollers 18 being biased relative to the roller nut tube 9 increases the force that presses the surfaces of the meshed portions of the threads of these components towards each other. The surfaces of the threads being forced together more strongly acts to increase the frictional resistance therebetween, and thus the frictional resistance in the threaded engagement of the roller screw mechanism as a whole is increased. By coupling a motor to one of the roller screw and the roller nut tube, and coupling a punch to the other, the tendency of the roller screw mechanism to rotationally couple the motor and punch may be increased.

While the above holds true when there is no external axial force applied to the components of the roller screw mechanism, such external loading can counteract the effect of the springs 52. However, the presence of such loading inherently increases the friction between the threads, thus counteracting the influence of the springs. For instance, if the roller screw 13 was urged upwards (from the perspective of FIG. 8) relative to the roller nut tube 9, the roller screw would lift the rollers 18 upwards against the bias of the springs 52, and the friction in the threaded engagement between the rollers and the roller nut tube would be decreased. However, the friction in the threaded engagement between the roller screw and the rollers would see a corresponding increase. The friction within the roller screw mechanism as a whole would therefore remain at an acceptable level.

Though the above has been described in relation to the punch being connected to the roller screw 13 and the motor being connected to the roller nut tube 9, other arrangements may utilise such a mechanism in a different fashion. For instance, the roller screw 13 may be axially stationary and driven to rotate by the motor, and the roller nut tube 9 may be connected to the punch and movable axially along the roller screw. Alternatively or in addition, as indicated above, the rollers 18 may be axially fixed relative to the roller screw 13 rather than the roller nut tube 9. In other words, the roller screw mechanism may work in four different configurations: axially fixed roller nut tube and rollers with axially movable roller screw, axially fixed roller nut tube with axially movable rollers and roller screw, axially movable roller nut tube and rollers with axially fixed roller screw, and axially movable roller nut tube with axially fixed rollers and roller screw. For the avoidance of doubt, other roller screw mechanisms (such as that described below) may also work in any of the above configurations.

Pre-loading of the threads of the second transmission, for instance by utilising the roller screw mechanism of FIG. 8, may also be beneficial in that with the rollers 18 urged axially relative to (in this case) the roller nut tube 9, the effect of wear of these components on the function of the apparatus can be minimised. Indeed, some arrangements may allow the friction in the threads for a given external loading to be maintained at a substantially constant level throughout normal wear of the mechanism. Whilst conventional threads become looser with wear, leading to greater clearance between the surfaces of the threads and consequently less friction between them, the springs 52 act to maintain a tight interface between the meshed threads of the rollers 18 and roller nut tube 9, and therefore maintain sufficient friction therebetween. Pre-loading the threads may also reduce play in the threads, thereby reducing backlash.

Figure 9:
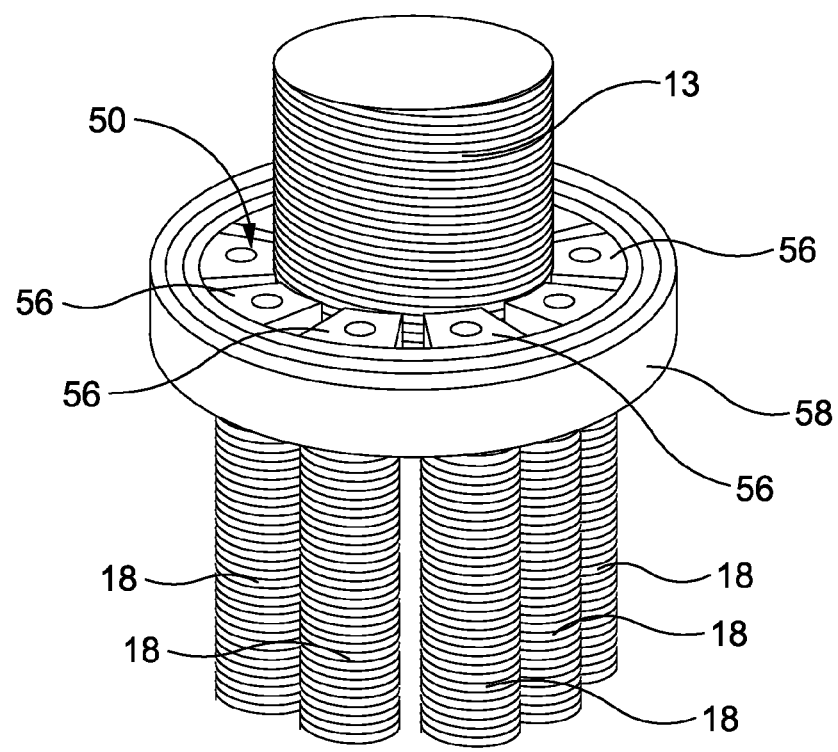
FIG. 9 is a schematic perspective view of part of another roller screw mechanism suitable for use with the invention.

FIG. 9 shows another arrangement of a pre-loaded roller screw mechanism. Again, the arrangement has a roller screw 13, a roller nut tube (not shown) and an array of rollers 18 held at each axial end in a cage 50 (only one of which is shown). In this case however, each cage 50 is made up of a plurality of segments 56. A spiral spring 58 (such as a tensator spring) is wrapped around the circumference of each cage 50, and acts to urge the segments 56 of the cages 50, and therefore the rollers 18, radially inwards towards the roller screw 13. The rollers 18 being radially urged against the roller screw 13 increases the friction in the threaded engagement in the same fashion as the arrangement of FIG. 8. Though in the above example each roller has an individual segment 56 of each cage 50, in other arrangements one or more rollers may share a common segment. In other examples, only one of the cages 50 may be segmented. Similarly, though in this example the rollers 18 are biased radially inwards towards the roller screw 13, in other embodiments they may be biased outwards towards the roller nut tube (not shown). This may be beneficial in that in the arrangement of FIG. 9, as the rollers 18 revolve around the roller screw 13 centrifugal force would counteract some or all of the force from the spring 58, whereas if the spring urged the rollers outwards towards the roller nut tube, centrifugal force would compound the effect of the spring.

Due to the space taken up by the springs on the radially outer side of the cages, the mechanism shown in FIG. 9 may be more suited to situations where the rollers are axially fixed relative to the roller nut tube 9. This would avoid the necessity for the rollers to engage with the inside of the roller nut tube, and for the springs to fit within the roller nut tube without touching it, since the springs could then be positioned on the axial extremities of the roller nut tube.

Figure 10:
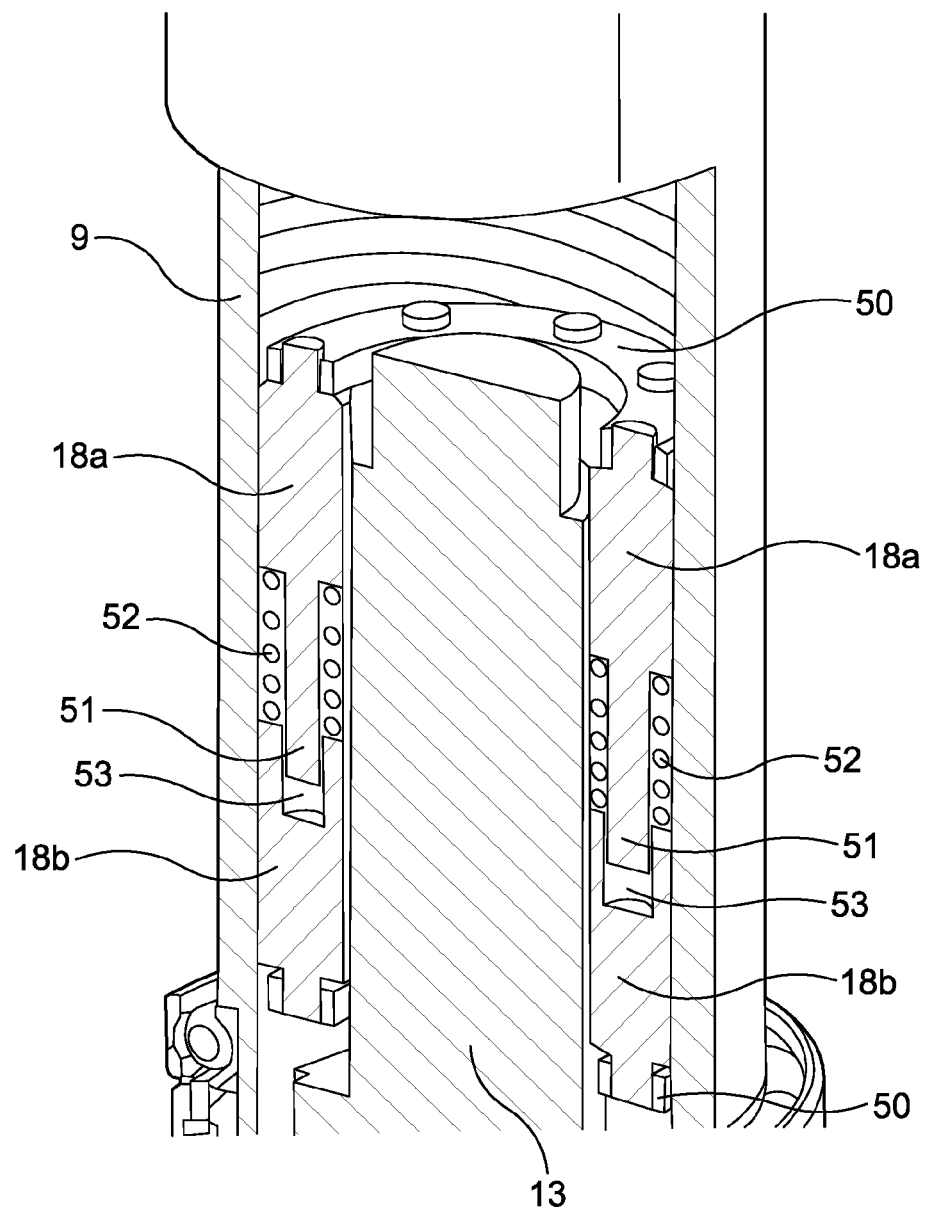
FIG. 10 is a schematic cutaway perspective view of a further roller screw mechanism suitable for use with the invention.

FIG. 10 shows a further arrangement of a pre-loaded roller screw mechanism. In this arrangement, each roller comprises two axially-spaced roller sections 118a, 118b. Each upper (from the perspective of FIG. 10) roller section has a shaft 51, which is received within a complementary recess 53 in the corresponding lower roller section 18b. The upper 18a and lower 18b roller sections of each roller are therefore move axially relative to one another. A coil spring 52 is positioned between the upper 18a and lower 18b roller sections of each roller, and acts to urge the roller sections apart. The roller sections 18a, 18b are prevented from moving apart in situ by their threaded engagement with the roller screw 13 and roller nut tube 9. The additional loading in the threaded engagement of each roller produced by its spring 52 therefore increases the friction in the roller screw mechanism.

In other arrangements, less than all of the rollers may comprise axially-spaced roller sections. In such arrangements, one or both of the cages 50 must be adapted to allow axial motion of the roller sections mounted thereto relative to the rollers which are not split into roller sections.

Figure 11:
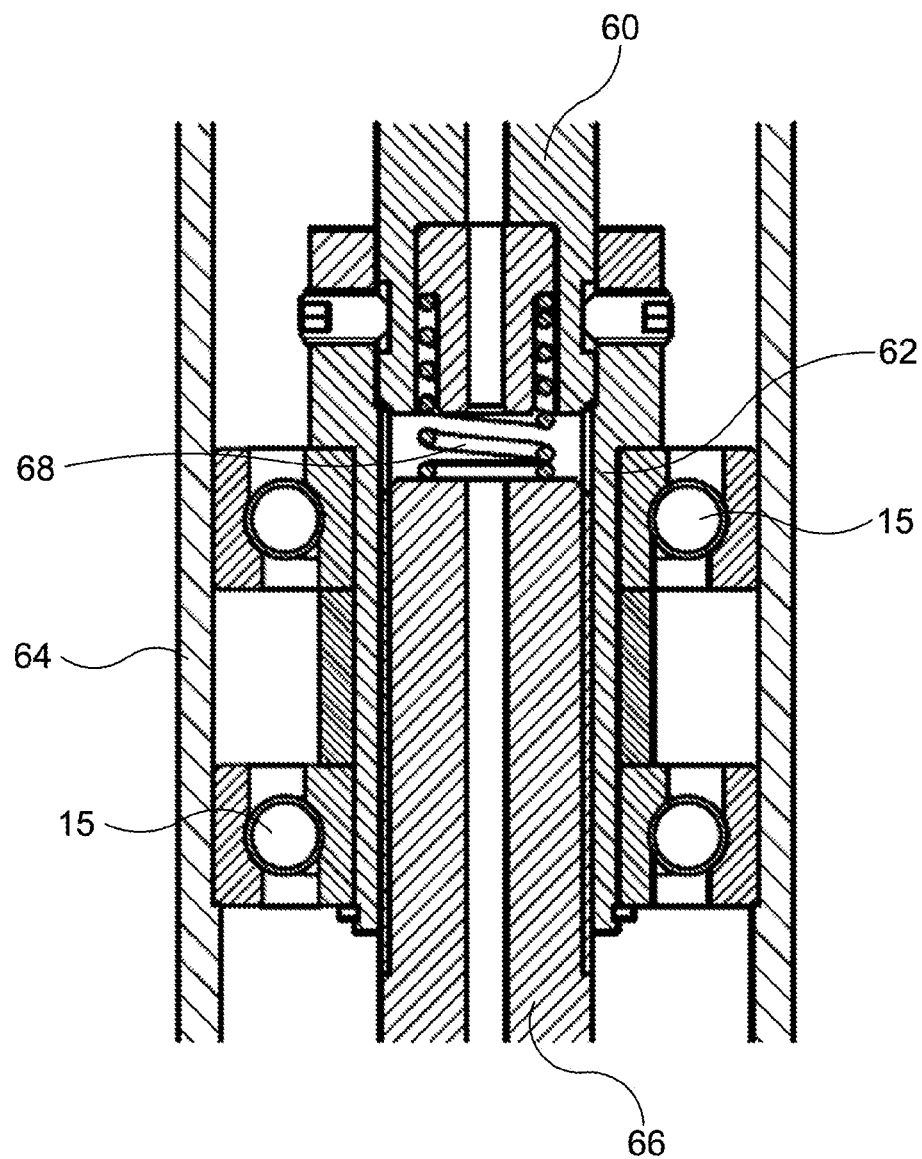
FIG. 11 is a cross-sectional side view of a lead screw mechanism suitable for use with the invention.

The threads of the second transmission may also be pre-loaded in arrangements which do not utilise a roller screw mechanism. FIG. 11 shows a lead screw mechanism with pre-loaded threads which may be utilised as the second transmission in such an arrangement. The mechanism comprises a drive shaft 60 terminating in an internally-threaded nut 62. The nut 62 is mounted within a housing 64 with bearings 15, which prevent its axial movement but allow it to rotate within the casing. An externally-threaded output shaft 66 is received within the nut 62 and threadedly engaged therewith. As with a conventional lead screw mechanism, rotation of the nut 62 relative to the output shaft 66 causes linear movement of the output shaft relative to the nut, but if the friction between the threads is sufficient to rotationally couple the nut 62 and output shaft 66, the two components will rotate together and the shaft will not move axially. To pre-load the threads to increase the friction between the nut 62 and the output shaft 66, a coil spring 68 is held compressed between opposed end faces of the drive shaft 60 and the output shaft 66. The spring 68 acts to urge the drive shaft 60 (and therefore the nut 62) and the output shaft 66 apart, thus pre-loading the threads. To use this arrangement in the first aspect of the invention (or the fifth aspect of the invention), the motor may be coupled to the drive shaft 60 and the punch to the output shaft 66. In an alternative arrangement, the motor may be connected to the output shaft 66 (which would then become a drive shaft) and the punch may be connected to the drive shaft 60 (which would then become an output shaft).

Figure 12:
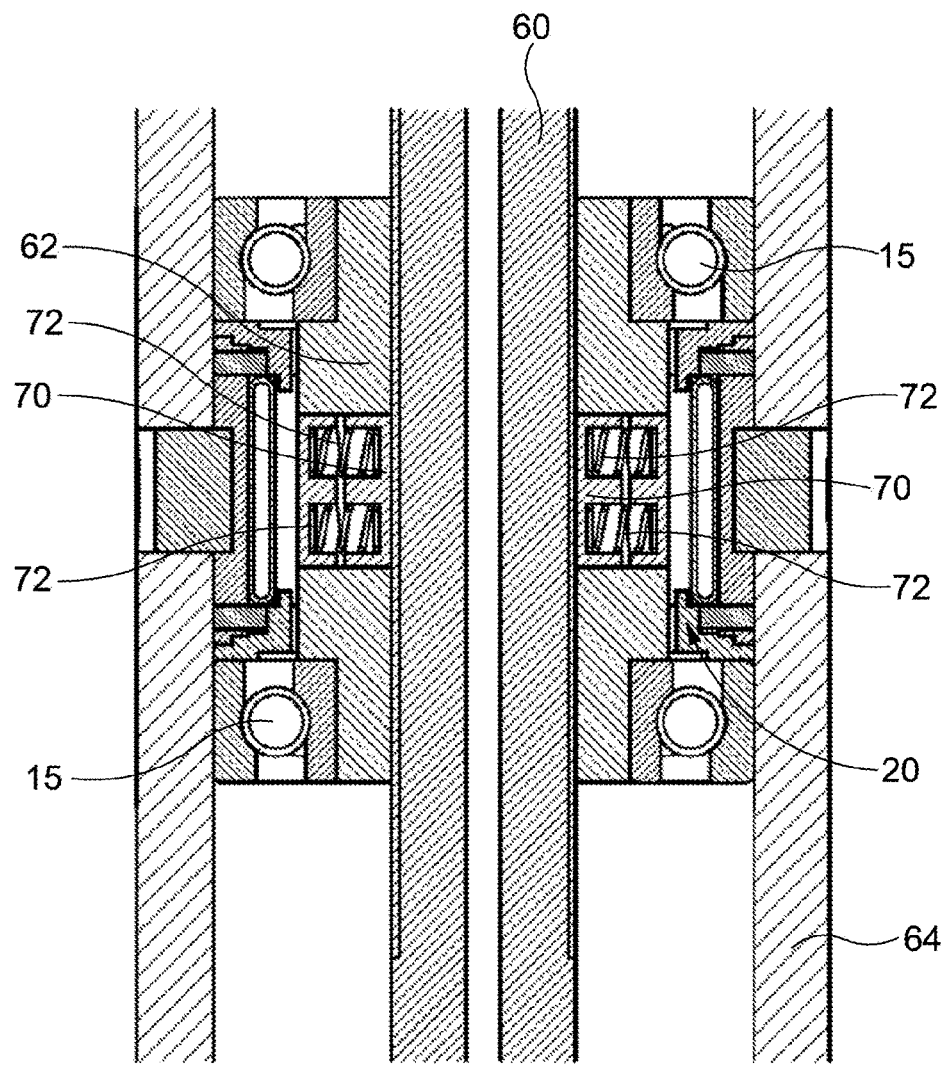
FIG. 12 is a cross-sectional side view of another lead screw mechanism suitable for use with the invention.

FIG. 12 shows another lead screw mechanism with pre-loaded threads. In this arrangement, the (externally-threaded) drive shaft 60 also functions as the output shaft. The shaft 60 is in threaded engagement with a nut 62, which is mounted by bearings 15 such that it is axially fixed but rotatable within a housing 64. In this arrangement, the rotation of the nut 62 is controlled by a variable-influence brake system 20 (which is identical to that of the first embodiment and so will not be described in detail). In this arrangement, the nut 62 has a plurality of pressure pads 70 received in cavities therein. In this embodiment the pressure pads are threaded for engagement with the drive shaft 60 (however in other embodiments they may not be). The pressure pads 70 are urged radially inwards, against the drive shaft 60, by coil springs 72. With the drive shaft 60 driven to rotate by the motor, by engaging the variable-influence braking system 20 to restrict the rotation of the nut 62, the drive shaft rotates relative to the nut and thus moves axially. If the nut 62 rotates along with the shaft 60, there is no relative rotation and so no axial movement results. The pressure pads 70 being urged against the drive shaft 60 pre-loads the threaded engagement between these components, increasing the friction in the lead screw mechanism and thus increasing the extent to which the nut 62 and shaft 60 can rotate together. In an alternative arrangement, the pressure pads may be received in longitudinal slots in the nut, and be urged in an axial direction. In a further alternative arrangement, the pressure pads may be positioned about the outer circumference of the nut and urged radially outwards against the housing within which the nut is rotatable (such as the variable-influence brake system in this example).

To use this arrangement in the first aspect of the invention (or the fifth aspect of the invention), the motor and punch may be coupled to the drive shaft 60. In this case the motor is coupled to the drive shaft through a mechanism by which the coupling can be maintained as the shaft moves. In an alternative arrangement, the motor may drive the drive shaft 60 but the nut 62 may be connected to the punch and be axially movable within the housing 64. In another alternative arrangement, the motor may drive the nut 62 and the punch may be connected to the drive shaft 60 (which would then function as an output shaft).

In a further example of a pre-loaded lead screw mechanism, the nut may be formed from two axially-spaced portions (each of which may take the form of a complete nut) which are urged together or apart. In such an arrangement, when an axial load is applied (i.e. a load which urges the nut and shaft to move relative to each other in an axial direction), the friction between the shaft and one portion of the nut would be decreased, but the friction between the shaft and the other portion would be increased. Indeed, the load may be sufficient to completely counteract the force biasing the two portions apart. In this case, the entire load would be supported by one of the portions. In one alternative arrangement, the threads of the lead screw mechanism may be pre-loaded using two axially-spaced portions are urged to rotate relative to each other. In another alternative arrangement, only a circumferential sector of the nut is formed from two axially-spaced portions. In a further alternative arrangement, the nut is formed from a plurality of circumferentially-spaced portions with gaps therebetween, the circumferentially-spaced portions being urged radially inwards (e.g. by a tensator spring).

The threads of the second transmission may be pre-loaded externally (that is to say by a component that is not comprised within the second transmission). For instance, the apparatus of the first embodiment may be modified to include springs (or other biasing members) held compressed between the tops of the keys 30 and the tops of their respective keyways in the keyed tube 12. The springs would urge the keyed tube 12, and therefore the roller screw 13 and the rollers 18 upwards (from the perspective of FIGS. 1-3), relative to the roller nut tube 9, increasing the friction between the rollers and roller nut tube in the same fashion as described above.

Figure 13:
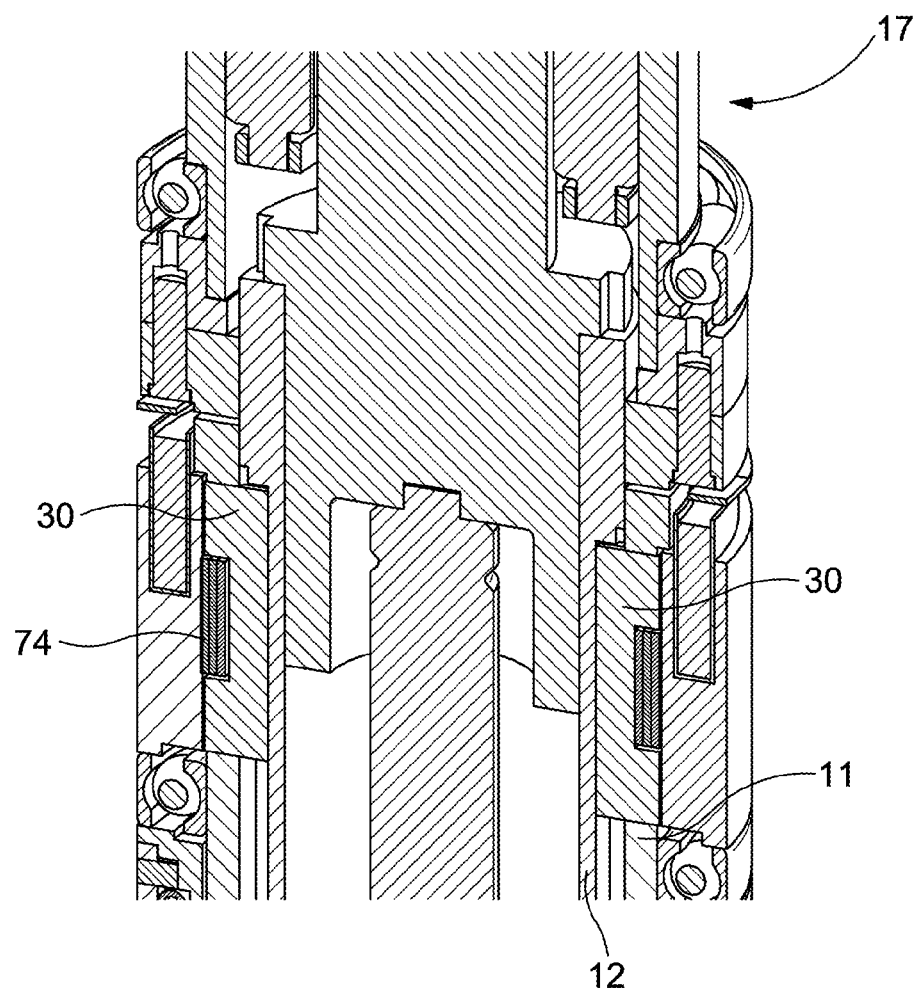
FIG. 13 is a cross-sectional side view through a modification of the first embodiment which includes a linear brake.

FIG. 13 shows another example of external pre-loading in the second transmission 17 of the first embodiment. In this arrangement the keys 30 have been modified so that there is substantial sliding friction as they travel within the keyed tube 12. The keys 30 are radially movable within the rotating bush 11, and are urged inwards against the keyed tube 12 by a tensator spring 74. The keys 30 being urged against the keyed tube 12 increases the friction therebetween. The keys 30 and keyed tube 12 therefore form a linear brake (that is to say a brake which is configured to resist at least linear motion) which opposes linear movement of the keyed tube 12 (and thus the punch). The resistance to motion of the keyed tube 12 would increase the loading in the threads of the second transmission 17 whenever the keyed tube was moving axially. The lack of pre-loading when the keyed tube 12 is stationary would not be detrimental to the function of the apparatus, as (presuming the motor is energised) the keyed tube is only axially stationary when the second transmission 17 is fully disengaged, meaning that the first transmission 8 is fully engaged and no additional rotational coupling is required.

For the avoidance of doubt, the above arrangements are purely exemplary, and internal or external pre-loading of the second transmission may be carried out in any other suitable fashion. For instance, a biasing spring and/or linear brake may be positioned in any other suitable location and/or act on any other suitable component of the apparatus.

The above process, or any other method discussed herein, may be controlled to a further degree through adjustment of the motor characteristics, for instance by varying its speed/torque profile simultaneously or sequentially with the operation of the brake and/or clutch.

In order to maintain the engagement of the radial ridges of the rivet with the radial grooves of the punch, the rivet may be held in position by a temporary adhesive or mechanical means such as spring biased jaws, or it may be biased towards the punch by compressed air blowing it (or a vacuum sucking it) into engagement with the punch.

The described embodiments outline a particular way in which the first transmission can be selectively adjusted (e.g. linear control of degrees of engagement from fully disengaged to fully engaged, as is the case in the first embodiment). However, it should be understood that the way in which the first transmission can be selectively adjusted may take any other suitable form. For example, it may be adjustable only between two degrees of engagement (such as fully disengaged and fully engaged). As another example, it may be adjustable only between a plurality of different degrees of partial engagement. As a further example, one or more of the transmissions may be pre-set to a particular degree of engagement throughout a riveting operation. The above may also apply to the second transmission. The degrees of engagement of the first and second transmissions may be inversely proportional to one another (as is the case in the third embodiment), may be entirely independent, or may have any other suitable interrelationship.

Although in the second embodiment of the invention the rivet continues to be rotated throughout its entry into the workpiece, in other embodiments it may begin to rotate after it has partially penetrated the workpiece without rotating, or it may partially penetrate the workpiece while rotating before being driven further into the workpiece without rotating. This may allow the different requirements for acceptable penetration of workpiece layers of different materials to be satisfied. Completing the insertion of a fastener without rotating it may engage anti-rotation features of the fastener, and/or may exert greater compressive force within the joint and improve fatigue resistance. However, the fastener rotating throughout its insertion may minimise tearing of the workpiece. In other embodiments, the rotation of the rivet may start and/or stop multiple times throughout its insertion.

Although in the second embodiment the rivet is upset within the workpiece, in other embodiments it may fully penetrate the workpiece before being fully upset (either while rotating or having first stopped rotating). Completion of rivet upsetting after full penetration may be particularly useful when driving the rivet though polymeric or composite materials, as these materials may be less ductile and more prone to cracking than metals. In addition, fully upsetting the rivet after full penetration may be used to flare the rivet to a greater extent than would be possible than if it was deformed within the workpiece. This would allow a larger surface area of the deformed portion of the rivet to contact the workpiece, decreasing the pressure applied by the rivet during loading of the joint.

In relation to the fourth embodiment, the central portion (or the rotatable portion of the upsetting die if a different upsetting die arrangement is used) may begin to rotate before the rivet contacts the workpiece. This may allow the central portion to reach a required rotational speed and/or the workpiece to reach a required temperature before the rivet contacts the workpiece, which may speed up the process cycle time. Instead, the central portion (or the rotatable portion of the upsetting die if a different upsetting die arrangement is used) may begin to rotate simultaneously as the rivet touches the workpiece. In alternative embodiments, the central portion (or rotatable portion of the upsetting die) may rotate only when in the extended position or only when in the retracted position. Alternatively or in addition, rather than rotating throughout the driving of the rivet, the central portion (or rotatable portion of the upsetting die) may be rotationally stationary for part or all of the duration of the rivet's entry into the workpiece. This may allow the different requirements for acceptable penetration of workpiece layers made of different materials to be satisfied.

Although specific examples and explanations have been given above, the invention is suitable to be utilised in, or applied to, methods of spot-joining utilising any process profile. In other words, the invention may apply rotational and/or axial movements or forces to the punch, the movements/forces being of any magnitude, in any combination and following any timing sequence. The apparatus may make use of motor speed and/or acceleration control, for instance it may utilise servo control technology. A further example of a stage in a process profile according to the invention (beyond those outlined above) is a pause in fastener driving where the punch neither rotates nor moves axially. Such pauses may take place at any time. A pause may be utilised to allow time for external heating to be applied to the workpiece before or after frictional heating, or to allow time for an adhesive situated between workpiece layers to spread. Another stage in a process profile may be an extended axial movement of the punch (whether rotating or otherwise) after contacting the surface of the workpiece, in order to press two or more layers of the workpiece together before joining them. For instance, the punch may be advanced onto the top layer of a workpiece without rotating, and may then continue its axial movement to press the top layer into the lower layer(s). The punch may then rotate and begin driving the fastener into the workpiece.

Although the embodiments of the invention discussed above all relate to apparatus or methods for friction stir self-piercing riveting, it is to be understood that the invention can also be applied to many alternative friction stir spot-joining methods or pieces of apparatus. For instance, the punch of the first embodiment may drive a solid rivet, in which case the apparatus may or may not have an upsetting die at all. In the case of a solid rivet being driven the upsetting die, if present, may be a coining die, any suitable substantially flat surface or a slug removal die, rather than a die with a cavity as described previously. Instead of driving a rivet, the punch may drive a self piercing nut (in which case the punch or the die may have a reciprocable bolt to force workpiece material out of the thread area of the installed nut). The punch may also drive a self piercing stud (in which case again an upsetting die may or may not be present) or a blind rivet. Furthermore, rather than driving a fastener of any kind, the punch may take the form of a friction stir spot welding punch or may take the form of a clinching punch (an upsetting die being required in the case of a clinching operation). By way of an example, FIG. 14 shows a fifth embodiment of the invention which is a friction stir clinching operation. FIG. 15 shows an upsetting die for a friction stir clinching apparatus which may be used in the above operation, the die in this case having a rotatable central portion. It is to be understood that throughout the description, in the case of a different type of fastener being driven or a welding or clinching operation being performed, discussion of the rivet (in relation to it touching the workpiece and the like) should be read as relating to the different type of fastener or to the clinching or welding punch. For the avoidance of doubt, any of the above forms of die may be utilised in an apparatus or method for driving any of the above types of fastener or punch, or any other suitable type of fastener or punch.

For the avoidance of doubt, the workpiece may comprise a single layer. Alternatively, it may comprise two or more layers of material. The layers may all be different materials, or two or more of the layers may be made of the same material.

Regardless of the operation in question, the apparatus may utilise the nose of the apparatus, or another component, to clamp the workpiece. As well as holding multiple layers together while fastening takes place, clamping the workpiece may produce a more uniform joint area and may assist in the containment of flash produced during the friction stir step(s) of the joining operation. In addition, a clamping force may be utilised to assist the spread of an adhesive applied between workpiece layers at a joint.

In one apparatus which utilises workpiece clamping, the tool has a clamping nose which is coupled to the punch (directly or indirectly) by a resilient member. The clamping nose and punch are configured to be driven towards the workpiece together, and relatively positioned such that the clamping nose contacts the workpiece first. As the punch continues to advance, the resilient member is deformed and its restorative force acts to urge the clamping nose against the workpiece, thereby effecting clamping. This arrangement may provide additional benefit in that the deformation of the resilient member may also act to pre-load the threads of the second transmission by urging the roller screw upwards (as described above).

Any recitation of a motor should not be interpreted as referring to an electric motor specifically but rather to any form of rotary actuator, such as a hydraulic or pneumatic motor.

Where the above description refers to a spring, such as a tensator spring or a coil spring, that component may instead take the form of a different type of resilient member. Examples of resilient members include leaf springs, Belleville washers, coil springs, volute springs, tensator springs, gas springs, and elastomeric tubes, rods, sheets and blocks. Alternatively, one or more of the springs (or other types of resilient member) may be replaced with an actuator such as a solenoid or electromagnet. Such an actuator may be arranged to generate a constant force throughout operation of the apparatus, or it may be actively controlled (for example a solenoid may be used in pre-loading, and may be energised only when rotational coupling through the threads is desired).

Although in the described arrangements and methods the degrees of engagement of both the first and second transmissions can be adjusted to any value between fully disengaged and fully engaged, in other embodiments only one of the transmissions may be selectively adjustable, the other transmission remaining in a constant state of partial or full engagement. In further embodiments one or both of the transmissions may be adjustable only between two or more finite degrees of engagement. For example, the first transmission may be adjustable only between fully disengaged and fully engaged states, and/or the second transmission may be adjustable only between three different degrees of partial engagement. For the avoidance of doubt, the above may also apply in relation to the extent to which a multifunctional transmission can perform the first and second functions.

The methods and/or apparatus according to the invention may be suitable for automated control or monitoring. In particular, the transmission control apparatus may include one or more feedback devices or sensors such as force sensors, torque sensors, temperature sensors or (rotary or linear) resolvers or positional encoders incorporated within the apparatus. The information from these sensors may be used by a controller such as a computer to monitor the riveting process or collect data for quality assurance or performance monitoring. Alternatively or in addition, the information from such sensors may be used to supply feedback to the controller as to the status or dynamic performance of the apparatus (e.g. the forces and motions currently being applied to the punch or the temperature of the workpiece). From this feedback the controller can calculate and/or implement real-time adjustments.

In one example of the use of a controller and sensors, data from torque sensors and axial force sensors may be collected for the sake of quality assurance. For instance, an unusually high peak torque or peak axial force may indicate that the workpiece material is out of tolerance and is harder than is desired, or may indicate that the rivet is misshapen. Furthermore, positional encoders may feed back to the controller to enable it to detect the axial position of the punch and calculate the depth of penetration of the rivet. It may then make real-time adjustments as the rivet progresses. For instance, where the rivet is to be driven through the first layer of a workpiece without rotating before being driven through the second layer while it rotates, the controller may use axial positional information to determine when the rivet has penetrated the first layer of the workpiece and the first transmission should be engaged.

In another example of use of a controller and sensors, the controller may monitor the maximum axial displacement of the punch in order to detect the production of a faulty joint. In this case, an unusually high maximum displacement may indicate that a fastener has been driven too far into the workpiece, or an unusually low maximum displacement may indicate that the fastener driving process was not successfully completed. Furthermore, the controller may utilise feedback from torque and axial force sensors for real-time process control. For instance, after a fastener has just contacted the workpiece and begun to rotate, the controller may engage the second transmission to drive the rivet after the torque required to rotate it has dropped below a particular value (indicating sufficient workpiece softening).

When calculating real-time adjustments for process control, or when calculating deviation of a value from the norm for quality assurance, the controller may compare the collected value against an average value, the average value having been calculated by the controller using data it collected from past operations. Alternatively, it may compare the value against a predetermined ideal, maximum or minimum value.

Other arrangements may utilise one or more feedback devices or sensors such as force sensors, torque sensors, temperature sensors or (rotary or linear) resolvers or positional encoders or any other suitable component. The information from the sensors may be used for the purposes of process monitoring, quality assurance, process control, statistical data collection, machine diagnostics or for any other suitable purpose.

The linear movement of the punch of the first or third embodiments to drive the rivet may be performed with the second transmission partially engaged even if rotation of the rivet is not actively required. This could decrease the axial speed of the punch without requiring the speed of the motor to be adjusted, which may allow simpler and/or cheaper motor control systems to be used. This may also apply in relation to the multifunctional transmission of the fifth aspect of the invention performing the first function.

The apparatus may be configured to provide sufficient heat dissipation from the workpiece or from the brake, clutch or any other component of the apparatus. For instance, the components in need of cooling may be spaced from each other and/or may include fins or apertures to allow sufficient convective and radiant cooling. The apparatus may include active coolant systems such as fans or refrigerant circulation systems instead or in addition. The above cooling features and systems may be used individually or in combination, and multiple components may be cooled utilising common features or systems. Similarly, methods according to the invention may include cooling processes applied to the workpiece, brake, clutch or any other component. Such processes may utilise one or more of the cooling features or systems given above. By way of example, the process may be controlled to keep the maximum temperature of the fastener/punch and workpiece below a certain point so as to avoid damaging a coating (such as a corrosion resistant layer) thereon. One or more temperature sensors may be utilised to monitor the temperature of the workpiece and/or punch or fastener.

For the avoidance of doubt, it is to be understood that the modifications given above are also applicable to any other aspects of the invention, where appropriate.

The invention claimed is:

1. A spot-joining apparatus comprising:
a motor;
a rotatable and linearly moveable punch for driving a fastener or performing a clinching or friction stir spot welding operation;
a first transmission configured to transfer rotary motion of the motor to the punch when engaged;
a second transmission configured to convert rotary motion of the motor to linear motion of the punch, and thereby drive the punch towards a workpiece, when engaged; and
a transmission control apparatus arranged to selectively adjust the degree of engagement of at least one of the first and second transmissions,
wherein the transmission control apparatus comprises a clutch.

2. The spot-joining apparatus of claim 1 wherein the transmission control apparatus is arranged to selectively adjust the degree of engagement of both the first and second transmissions.

3. The spot-joining apparatus of claim 1 wherein the transmission control apparatus is arranged to selectively adjust the degree of engagement of said transmission or transmissions to any degree of engagement within the operable range of the transmission.

4. The spot-joining apparatus of claim 1 wherein the transmission control apparatus is arranged to selectively adjust the degree of engagement of said transmission or transmissions between fully disengaged and fully engaged states.

5. The spot-joining apparatus of claim 2 wherein the second transmission comprises a first threaded member connected to the motor and a second threaded member connected to the punch, the threads of the first and second threaded members being arranged to directly or indirectly act on each other to convert rotation of the first threaded member relative to the second threaded member into linear motion of the second threaded member.

6. The spot-joining apparatus according to claim 5 wherein the second transmission comprises one or more intermediate threaded members each in threaded engagement with both the first and second threaded members, the first and second threaded members being configured to act on each other through the one or more intermediate threaded members.

7. The spot-joining apparatus of claim 6, wherein the transmission control apparatus is configured to engage the first transmission by rotationally coupling the first and second threaded members so as to restrict relative rotation therebetween, and is configured to engage the second transmission by restricting rotation of the second threaded member so that relative rotation of the first and second threaded members takes place.

8. The spot-joining apparatus of claim 7 wherein the threads of the first and second threaded members are configured to rotationally couple the first and second threaded members through frictional resistance therebetween, the threads being configured to alter the degree of frictional resistance offered in response to an alteration in axial loading of the threads.

9. The spot-joining apparatus according to claim 8 further comprising a linear brake arranged to resist axial motion of the punch and thereby apply a load to the threads of one or both of the first and second threaded members.

10. The spot-joining apparatus according to claim 9 further comprising a resilient member configured to apply load to the threads of one or both of the threaded members.

11. The spot-joining apparatus according to claim 10, wherein the resilient member acts directly or indirectly on the intermediate threaded members.

12. The spot-joining apparatus according to claim 1 wherein the clutch comprises a volume of magneto-rheological or electro-rheological fluid retained in a cavity between a component rotationally coupled to the motor and a component rotationally coupled to the punch, the clutch further comprising an electric or magnetic field generator arranged to selectively apply an electric or magnetic field to the volume of fluid in order to alter the viscosity of the fluid.

13. The spot-joining apparatus according to claim 1 wherein the transmission control apparatus is configured to selectively adjust the degree of engagement of the first transmission by controlling the amount of slip permitted by the clutch.

14. The spot-joining apparatus according to claim 13 wherein the transmission control apparatus comprises a variable-influence brake system.

15. The spot-joining apparatus according to claim 14 wherein the variable-influence brake system comprises a volume of magneto-rheological or electro-rheological fluid retained in a cavity between a rotationally fixed component and a rotational component, the variable-influence brake system further comprising an electric or magnetic field generator arranged to selectively apply an electric or magnetic field to the volume of fluid in order to alter the viscosity of the fluid.

16. The spot-joining apparatus according to claim 14 wherein the transmission control apparatus is configured to selectively adjust the degree of engagement of the second transmission by controlling the amount of slip permitted by the variable-influence brake system.

17. The spot-joining apparatus of claim 16 wherein the apparatus further comprises a controller configured to monitor the performance of the apparatus via one or more sensors.

18. The spot-joining apparatus of claim 16 wherein the apparatus further comprises a controller configured to gather feedback on the status or dynamic performance of the apparatus via one or more sensors, and calculate and/or implement real-time adjustments to said status or dynamic performance of the apparatus.

19. The spot-joining apparatus according to claim 1 wherein the apparatus is configured to be capable of accommodating the force/motion timings that may be required for any reasonable process profile.

20. The spot-joining apparatus according to claim 1 wherein the first transmission comprises substantially all the components of the second transmission.

21. The spot-joining apparatus according to claim 1 wherein the first transmission and the second transmission are substantially the same entity.

22. A method of driving a fastener, the method comprising:
bringing the fastener into contact with a workpiece;
causing the fastener to rotate under action of a first transmission, the first transmission transferring rotary motion of a motor to the fastener when engaged; and
driving the fastener into the workpiece under action of a second transmission, the second transmission translating rotary motion of said motor into linear motion of the fastener when engaged,
wherein the degree of engagement of at least one of the first and second transmissions is selectively adjusted by a transmission control apparatus.

23. The method according to claim 22 wherein the degree of engagement of both the first and second transmissions are selectively adjusted by the transmission control apparatus.

24. The method according to claim 22 wherein the fastener is caused to rotate at least one of before, simultaneously as, and after it contacts the workpiece.

25. The method according to claim 22 wherein the fastener is not rotated while it is driven into the workpiece.

26. The method according to claim 22 wherein the fastener is rotated throughout its travel into the workpiece.

27. The method according to claim 22 wherein the fastener is rotated during a part of its travel into the workpiece, and is not rotated during another part of its travel into the workpiece.

28. The method according to claim 22 wherein the performance of an apparatus used in the method is monitored by a controller via one or more sensors.

29. The method according to claim 28 wherein feedback on the status or dynamic performance of an apparatus used in the method is gathered by a controller through one or more sensors, the controller calculating and/or implementing real-time adjustments to said status or dynamic performance of the apparatus.

30. The method of claim 22 wherein the degree of engagement of at least one of the first and second transmissions fluctuates in response to changes in the forces exerted on the fastener by the workpiece due to resistance to deformation of the workpiece.

31. A spot-joining apparatus comprising:
a motor;
a rotatable and linearly movable punch for driving a fastener or performing a clinching or friction stir spot welding operation to thereby join first and second work pieces together;
a multifunctional transmission configured to perform a first function, which is to transfer rotary motion of the motor to the punch, and a second function, which is to convert rotary motion of the motor to linear motion of the punch; and
a transmission control apparatus arranged to selectively adjust the degree to which the multifunctional transmission performs at least one of the first and second functions,
wherein the transmission control apparatus comprises a clutch.

32. The spot-joining apparatus according to claim 31 wherein:
the multifunctional transmission comprises a first threaded member connected to the motor and a second threaded member connected to the punch;
the threads of the first and second threaded members are configured to directly or indirectly act on each other to convert rotation of the first threaded member relative to the second threaded member into linear motion of the second threaded member, thereby performing the second function of the multifunctional transmission; and
the first and second threaded members are configured to be rotatably coupled such that rotation of the first threaded member causes rotation of the second threaded member, thereby performing the first function of the multifunctional transmission.

33. The spot-joining apparatus of claim 1, wherein the first transmission is a rotary linkage between the motor and the punch which transfers rotary motion of the motor to rotary motion of the punch, and wherein the second transmission is a linear linkage between the motor and the punch which converts rotary motion of the motor to linear motion of the punch.

34. The spot-joining apparatus of claim 1, wherein the first and second transmissions are separate entities.

35. The spot-joining apparatus of claim 31, wherein upon rotary and linear motion of the punch, the punch is configured to deform the first work piece and is configured to deform the second work piece.

* * * * *